(12) United States Patent
Baron

(10) Patent No.: US 11,299,009 B2
(45) Date of Patent: Apr. 12, 2022

(54) VEHICLE HVAC SYSTEM WITH MODULAR DOOR DESIGN

(71) Applicant: DENSO International America, Inc., Southfield, MI (US)

(72) Inventor: Eric Baron, Southfield, MI (US)

(73) Assignee: DENSO International America, Inc., Southfield, MI (US)

( * ) Notice: Subject to any disclaimer, the term of this patent is extended or adjusted under 35 U.S.C. 154(b) by 140 days.

(21) Appl. No.: 16/813,902

(22) Filed: Mar. 10, 2020

(65) Prior Publication Data
US 2021/0283981 A1 Sep. 16, 2021

(51) Int. Cl.
*B60H 1/00* (2006.01)

(52) U.S. Cl.
CPC .................. *B60H 1/00671* (2013.01)

(58) Field of Classification Search
CPC ...... B60H 1/00671; B60H 2001/00707; B60H 1/00678; B60H 1/00685; B60H 1/00692
USPC ................. 454/108, 143, 152, 155
See application file for complete search history.

(56) References Cited

U.S. PATENT DOCUMENTS

| | | | |
|---|---|---|---|
| 3,234,896 A * | 2/1966 | Bonsall | A47B 87/0246 108/60 |
| 3,315,412 A * | 4/1967 | Hultgren | F41H 5/223 49/246 |
| 3,722,431 A * | 3/1973 | Howard | A47B 3/00 108/157.13 |
| 3,967,332 A * | 7/1976 | Fincher | A47C 23/061 5/286 |
| 5,472,269 A * | 12/1995 | Novikoff | A47B 21/00 312/195 |
| 5,478,145 A * | 12/1995 | Kamachi | F16B 12/12 312/263 |
| 5,699,601 A | 12/1997 | Gilliam et al. | |
| 6,296,562 B1 * | 10/2001 | Uemura | B60H 1/00692 251/901 |
| 6,447,388 B1 * | 9/2002 | de Barros | F24F 13/065 454/202 |
| 8,141,833 B1 * | 3/2012 | Plummer | E06B 9/02 248/229.1 |

(Continued)

FOREIGN PATENT DOCUMENTS

CN 106985638 A 7/2017
DE 102011014392 A1 9/2012
(Continued)

*Primary Examiner* — Vivek K Shirsat
*Assistant Examiner* — Ko-Wei Lin
(74) *Attorney, Agent, or Firm* — Brooks Kushman P.C.

(57) ABSTRACT

A modular door for a vehicle HVAC system includes a door plate, a first shaft, and a second shaft. The door plate has a front surface extending between an upper edge surface and a lower edge surface. The upper edge surface defines a first array of keyed orifices. The lower edge surface defines a second array of keyed orifices. The first shaft has a first keyed protrusion that is disposed within a first keyed orifice of the first array of keyed orifices. The second shaft has a second keyed protrusion that is disposed within a first keyed orifice of the second array of keyed orifices. The first keyed orifice of the first array of keyed orifices and the first keyed orifice of the second array of keyed orifices form a pair of axially aligned keyed orifices.

19 Claims, 11 Drawing Sheets

(56) References Cited

U.S. PATENT DOCUMENTS

| | | | |
|---|---|---|---|
| 2003/0063950 A1* | 4/2003 | Kelly | F16B 12/56 403/376 |
| 2004/0041455 A1* | 3/2004 | Tenbroeck | A47C 4/03 297/440.24 |
| 2005/0100399 A1* | 5/2005 | Welch | F16B 12/24 403/292 |
| 2007/0077879 A1* | 4/2007 | Marshall | B60H 1/00685 454/121 |
| 2010/0224253 A1* | 9/2010 | Azar | B60H 1/00678 137/1 |
| 2012/0270491 A1* | 10/2012 | Schaake | B60H 1/00685 454/155 |
| 2014/0004784 A1* | 1/2014 | Nolta, Jr. | B60H 1/00685 454/195 |
| 2015/0147113 A1* | 5/2015 | Crabtree, II | F16B 12/22 403/292 |
| 2016/0059673 A1* | 3/2016 | Goce | B60H 1/00678 454/152 |
| 2016/0227670 A1* | 8/2016 | Liu | H05K 7/20181 |
| 2018/0017091 A1* | 1/2018 | Schon | F16B 12/22 |
| 2019/0037911 A1* | 2/2019 | Wagner | A24C 5/06 |
| 2019/0241042 A1* | 8/2019 | Pinger | B60H 1/26 |
| 2019/0291537 A1* | 9/2019 | Krompass | B60H 1/00857 |
| 2019/0309551 A1* | 10/2019 | Hawkinson | E06B 7/215 |
| 2020/0240674 A1* | 7/2020 | Howe | F24F 13/105 |
| 2021/0180699 A1* | 6/2021 | Kelley | F16K 1/221 |

FOREIGN PATENT DOCUMENTS

| | | |
|---|---|---|
| FR | 2891339 A1 | 5/2007 |
| JP | 6058411 B2 | 1/2017 |
| KR | 101966456 B1 | 4/2019 |
| WO | 2010143378 A1 | 12/2010 |

* cited by examiner

VEHICLE HVAC SYSTEM WITH MODULAR DOOR DESIGN

TECHNICAL FIELD

The present disclosure relates to vehicle heating, ventilation, and air conditioning (HVAC) systems.

BACKGROUND

Vehicle HVAC systems may include one or more heat exchangers that are configured to condition air that is being delivered to a vehicle cabin. Vehicle HVAC systems may also include a series of ducts that are configured to route the conditioned air from the heat exchangers to various outlets within the vehicle cabin.

SUMMARY

A modular door for a vehicle HVAC system includes a door plate, a first shaft, and a second shaft. The door plate has a front surface extending between an upper edge surface and a lower edge surface. The upper edge surface defines a first array of keyed orifices. The lower edge surface defines a second array of keyed orifices. The first and second arrays of keyed orifices form pairs of axially aligned keyed orifices. The first shaft has a first keyed protrusion that is disposed within a first keyed orifice of the first array of keyed orifices. The second shaft has a second keyed protrusion that is disposed within a first keyed orifice of the second array of keyed orifices. The first keyed orifice of the first array of keyed orifices and the first keyed orifice of the second array of keyed orifices form a first pair of the pairs of axially aligned keyed orifices.

A modular door for a vehicle HVAC system includes a post, a door plate, a first shaft, and a second shaft. The post has an upper edge surface, a lower edge surface, and a lateral side defining a receptacle. The upper edge surface defines a first array of keyed orifices and the lower edge surface defines a second array of keyed orifices. The first and second arrays of keyed orifices form pairs of axially aligned keyed orifices. The door plate has a lateral edge disposed within the receptacle. The first shaft has a first keyed protrusion that is disposed within a first keyed orifice of the first array of keyed orifices. The second shaft has a second keyed protrusion that is disposed within a first keyed orifice of the second array of keyed orifices. The first keyed orifice of the first array of keyed orifices and the first keyed orifice of the second array of keyed orifices form a first pair of the pairs of axially aligned keyed orifices.

A modular door for a vehicle HVAC system includes a door plate and a shaft. The door plate has a front surface that extends between an upper edge surface and a lower edge surface. The door plate defines an array of parallel keyed cavities that extend from the upper edge surface to the lower edge surface. The shaft has a keyed portion disposed within a first keyed cavity of the array of keyed cavities. The shaft also has first and second ends that protrude from the upper edge surface and the lower edge surface, respectively.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
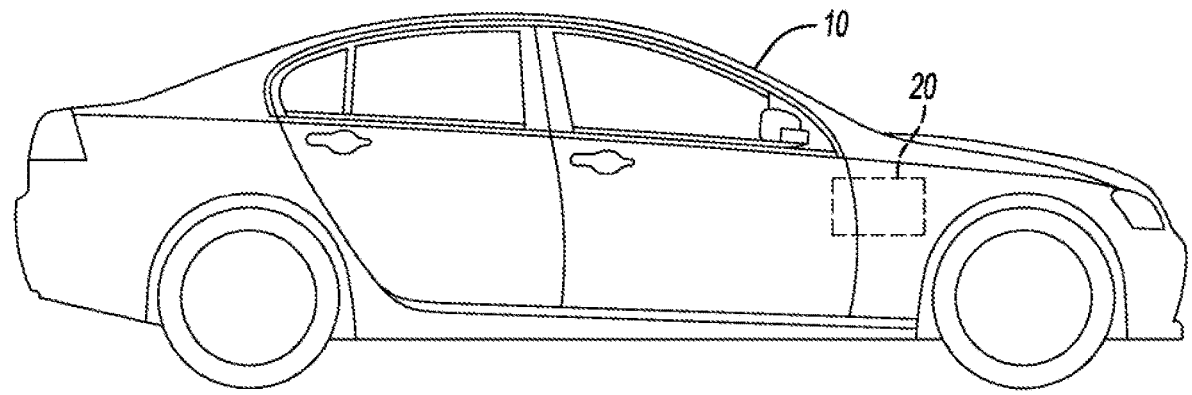
FIG. 1 is a schematic representation of a vehicle having an HVAC module.
Figure 2:
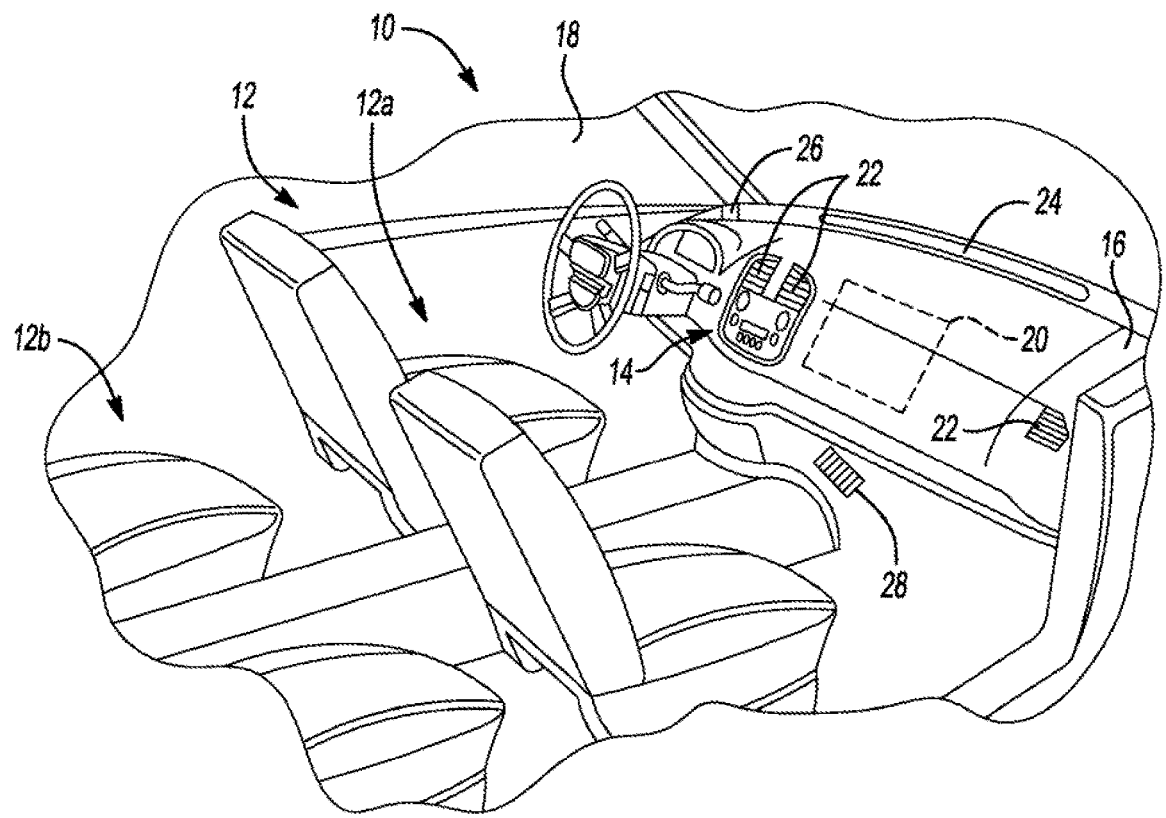
FIG. 2 is a fragmented perspective view of an automotive vehicle showing a portion of the passenger space or cabin.

Referring to FIGS. 1 and 2, a vehicle 10 having an HVAC module, casing, or housing 20 is illustrated. The HVAC module 20 is part of the HVAC system and/or ventilation system of the vehicle and therefore may be referred to as a vehicle HVAC module 20. The vehicle 10 includes a passenger space or vehicle cabin 12, which may include both a front passenger space 12a and a rear passenger space 12b. HVAC controls 14 allow for adjustment of the operation of HVAC module 20 to provide desired flows and/or conditioning of air that is being delivered to the vehicle cabin 12. The vehicle 10 may include an instrument panel (1P) or dashboard 16 that may have a series of outlets that are fluidly connected to the HVAC module 20. More specifically, the dashboard may contain center face vent outlets 22, a windshield defrost vent outlet 24, and demist vent outlets 26 that are used to direct airflow to the side windows 18 of the vehicle 10. The demist vent outlets 26 may also be referred to as the side window demist vent outlets. The demist vent outlets 26 may be on the top of the dashboard 16 or the side of the dashboard 16. The vehicle cabin 12 may also contain floor vent outlets 28 that direct airflow toward a passenger's feet. It should be understood that the vehicle 10 and HVAC module 20 depicted in FIGS. 1 and 2 are for illustrative purposes only and that the disclosure should not be construed as limited to the vehicle 10 and HVAC module 20 depicted in FIGS. 1 and 2.

Figure 3:
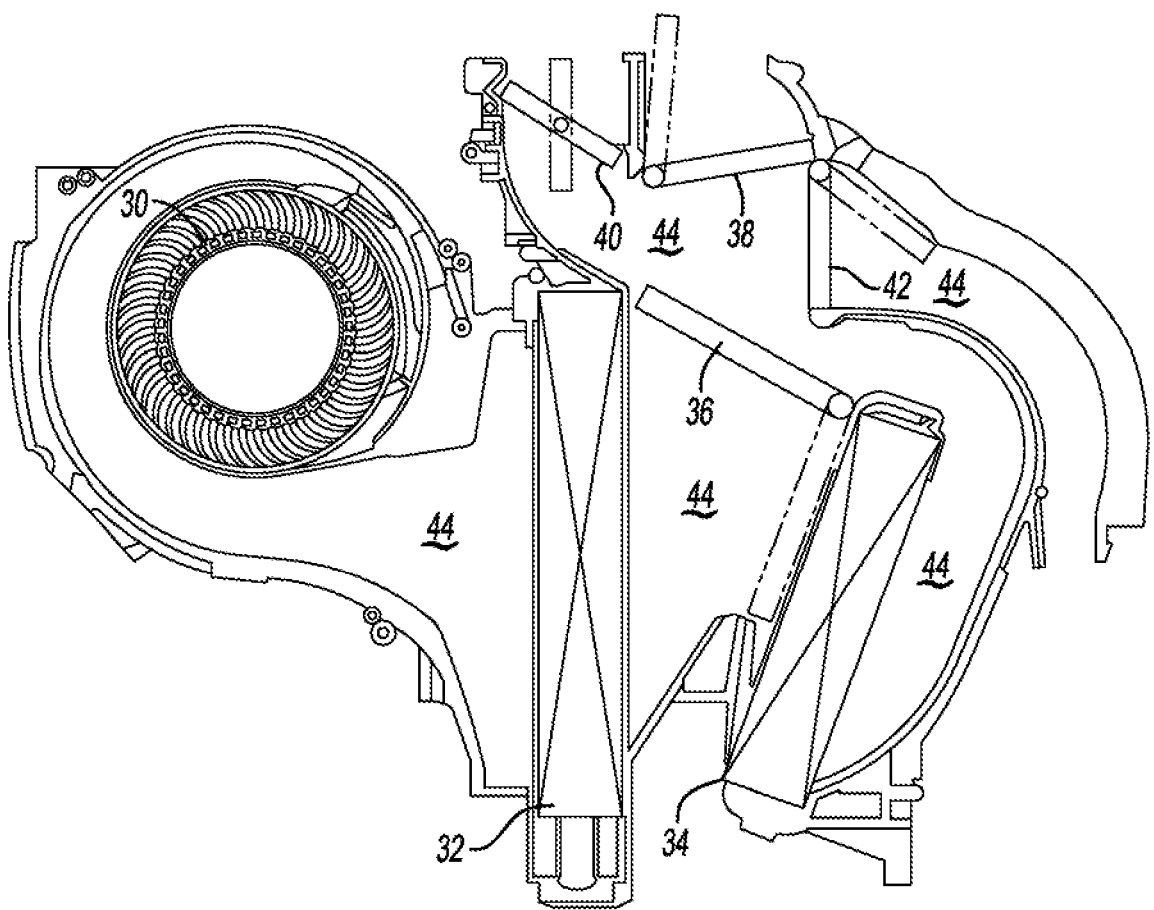
FIG. 3 is a cross-sectional view of the HVAC module.

Referring to FIG. 3, a cross-section of the HVAC module 20 is shown. The HVAC module 20 includes a blower fan 30, which may be referred to as a blower or an airflow generator. Downstream of the blower fan 30 is an evaporator 32 or first heat exchanger, which may be part of a refrigeration system that is configured to cool the air before delivering the air to the vehicle cabin 12. Also downstream of the blower fan 30 is a heater core 34, or second heat exchanger, that is used to heat the air before delivering the air to the vehicle cabin 12. An air mix door 36 may be used to determine the ratio of the air that flows through the heater core 34 relative to the air that flows around or bypasses the heater core 34. To control the air flow through the HVAC module 20 based on an air mode that has been selected by the vehicle operator via the HVAC controls 14, a series of doors may control the amount of air flowing out of the face vent outlets 22, the windshield defrost vent outlet 24, the demist vent outlets 26, and/or the floor vent outlets 28. Door 38 controls the airflow directed to the face vent outlets 22, known as the face door 38. Door assembly 40, controls airflow directed to the defrost vent outlet 24 and demist vent outlets 26. Door 42 controls the airflow directed to the floor vent outlets 28. The HVAC module 20 may define a plurality of channels or chambers 44 that are configured to direct airflow from the blower fan 30 to a least one outlet (i.e., the face vent outlets 22, the windshield defrost vent outlet 24, the demist vent outlets 26, and/or the floor vent outlets 28).

It should be understood that the HVAC module 20 depicted in FIG. 3 is for illustrative purposes only and that the disclosure should not be construed as limited to the HVAC module 20 depicted in FIG. 3. For example, the positioning of the doors (i.e., doors 36, 38, 40, and 42) may be different, the number of doors utilized may be different than illustrated, the positioning of the blower fan 30, evaporator 32, or heater core 34 may be different than illustrated, the types of doors utilized may different that illustrated (different types of doors are described in further detail below), the positioning of the channels or chambers 44 that are utilized route the air through the HVAC module may be different than illustrated, etc. Furthermore, each of the doors may be transitioned between the various positions by an actuator such as a servomotor, a Bowden cable, etc. The actuator may be directly connected to the door (e.g., an electric motor may be connected to a pivot shaft of the door) or may be indirectly connected to the door via gears, shafts, linking arms, etc.

Referring to FIGS. 4-8, several type of doors that may be utilized in a vehicle HVAC system (e.g., HVAC module 20) are illustrated. The doors may be configured to transition between at least two positions in order to restrict or permit airflow through at least one channel or chamber with an HVAC system (e.g., channels or chambers 44 in housing 20). For example, the doors 36, 38, 40, and 42 depicted in FIG. 3 are shown to transition between two positions. A first position of each door is shown in solid lines while a second position of each door is shown in phantom lines. It should be understood that each door may be transitioned to one or more intermediate positions between the first and second positions.

Figure 4:
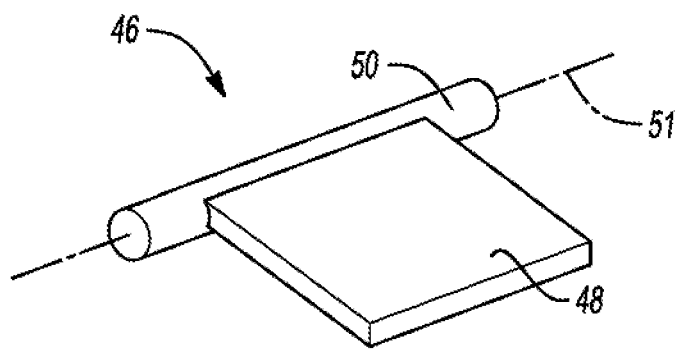
FIG. 4 is an isometric view of a flag type door that may be used in the HVAC module.

A flag type door 46 is illustrated in FIG. 4. Examples of flag type doors include doors 36, 38, and 42 depicted in FIG. 3. A flag type door 46 includes a door plate 48 that is configured to restrict or permit airflow through at least one channel or chamber with an HVAC system (e.g., channels or chambers 44 in housing 20). The door plate 48 is secured to a shaft 50 which allows the door plate 48 to rotate between one or more positions. The shaft 50 is configured to rotate about and axis of rotation 51. The shaft 50 may be secured within and rotatable within orifices that are defined by the housing of the HVAC system (e.g., housing 20). The shaft 50 may be directly connected or indirectly connected to an actuator to transition the flag type door 46 between two or more positions.

Figure 5:
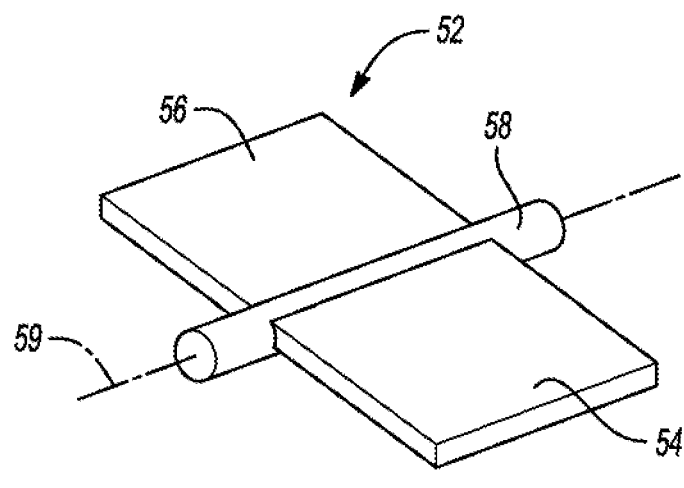
FIG. 5 is an isometric view of a butterfly type door that may be used in the HVAC module.

A butterfly type door 52 is illustrated in FIG. 5. An example of a butterfly type door is door 40 that is depicted in FIG. 3. A butterfly type door includes a first door plate 54 and a second door plate 56 that are configured to restrict or permit airflow through at least one channel or chamber within an HVAC system (e.g., channels or chambers 44 in housing 20). The first door plate 54 and the second door plate 56 are each secured to a shaft 58 which allows the first door plate 54 and second door plate 56 to rotate between one or more positions. The shaft 58 is configured to rotate about and axis of rotation 59. The shaft 58 may be secured within and rotatable within orifices that are defined by the housing of the HVAC system (e.g., housing 20). The shaft 58 may be directly connected or indirectly connected to an actuator to transition the butterfly type door 52 between two or more positions.

Figure 6:
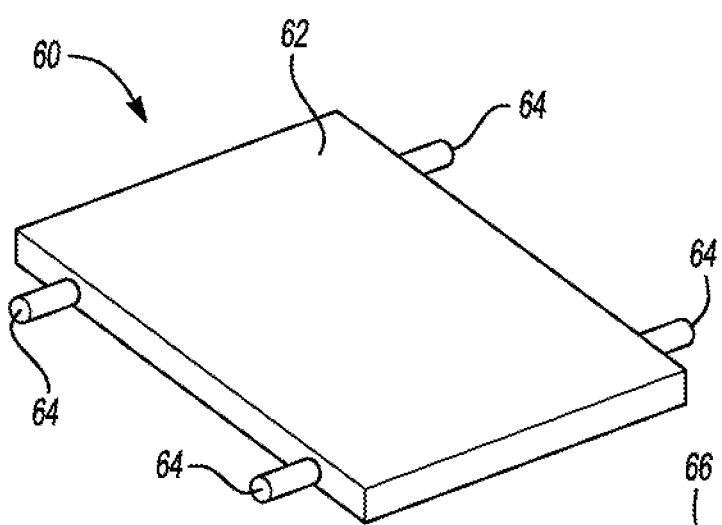
FIG. 6 is an isometric view of a pin and groove type door that may be used in the HVAC module.

A pin and groove type door 60 is illustrated in FIG. 6. A pin and groove type door includes a door plate 62 that is configured to restrict or permit airflow through at least one channel or chamber within an HVAC system (e.g., channels or chambers 44 in housing 20). A plurality of pins 64 are secured to and protrude from the door plate 62. The plurality of pins 64 may be disposed within grooves or slots that are defined by the housing of the HVAC system (e.g., housing 20). The plurality of pins 64 may be configured to slide along the grooves or slots to transition the door plate 62 between one or more positions to either restrict or permit airflow through at least one channel or chamber within an HVAC system. The door plate 62 or one or more of the plurality of pins 64 may be directly or indirectly connected to an actuator to transition the pin and groove type door 60 between two or more positions.

Figure 7:
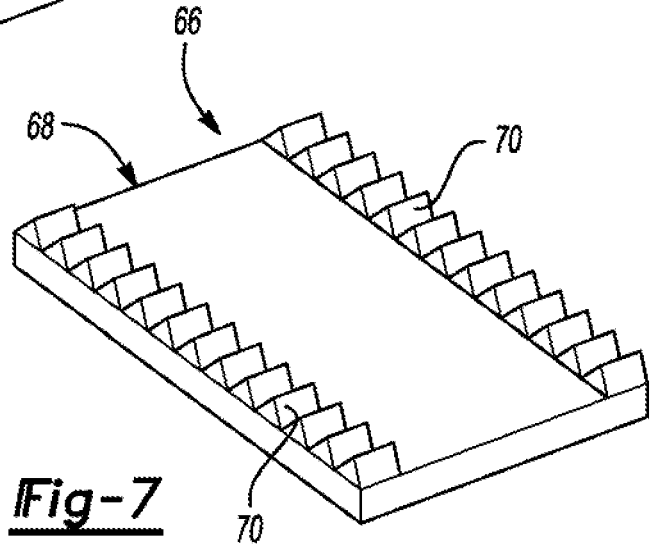
FIG. 7 is an isometric view of a rack and pinion type door that may be used in the HVAC module.

A rack and pinion type door 66 is illustrated in FIG. 7. A rack and pinion type door 66 includes a door plate 68 that is configured to restrict or permit airflow through at least one channel or chamber within an HVAC system (e.g., channels or chambers 44 in housing 20). The door plate 68 of a rack and pinion type door 66 includes a plurality of teeth 70 that form a rack that is configured to engage a pinion gear (not shown). The pinion gear engages the teeth 70 to transition the door plate 68 between one or more positions to either restrict or permit airflow through at least one channel or chamber within an HVAC system. The pinion gear may be directly connected or indirectly connected to an actuator to transition the rack and pinion type door 66 between two or more positions.

Figure 8:
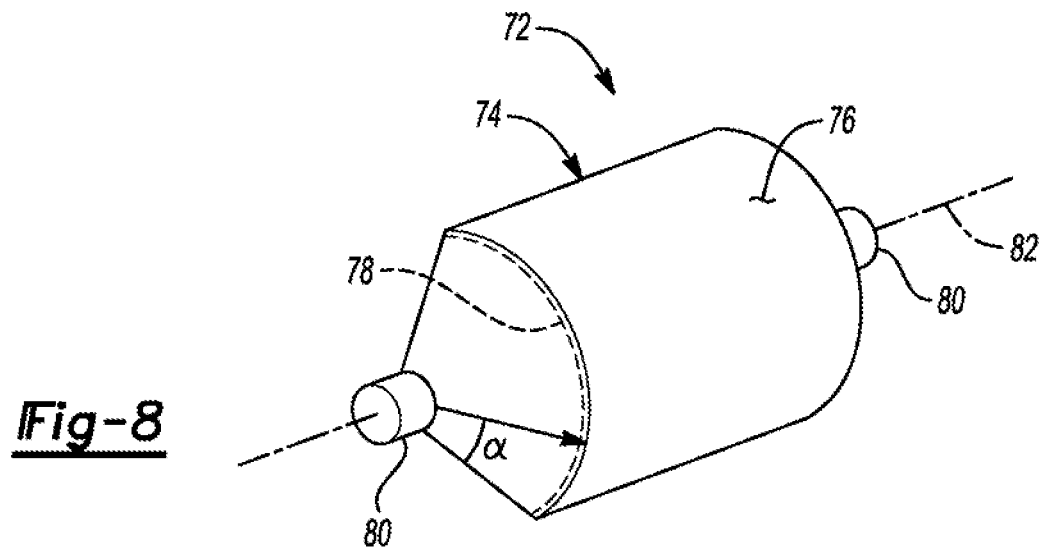
FIG. 8 is an isometric view of a barrel type door that may be used in the HVAC module.

A barrel type door 72 is illustrated in FIG. 8. The barrel type door 72 includes a central body 74. The central body 74 includes curved or rounded exterior plate 76 that defines a central opening 78. The curved or rounded exterior plate 76 is configured to restrict or permit airflow through at least one channel or chamber with an HVAC system (e.g., channels or chambers 44 in housing 20). The curved or rounded exterior plate 76 is secured to a shaft 80 which allows the curved or rounded exterior plate 76 rotate between one or more positions. The curved or rounded exterior plate 76 may secured to the shaft 80 radially outward relative to an axis of rotation 82 of the shaft 80. The shaft 80 may be secured within and rotatable within orifices that are defined by the housing of the HVAC system (e.g., housing 20). The shaft 80 may be a single solid shaft or may comprise two posts that protrude in opposing directions from the central body 74 that are axially aligned along axis of rotation 82. The shaft 80 may be directedly connected or indirectly connected to an actuator to transition the barrel type door 72 between two or more positions.

Figure 9:
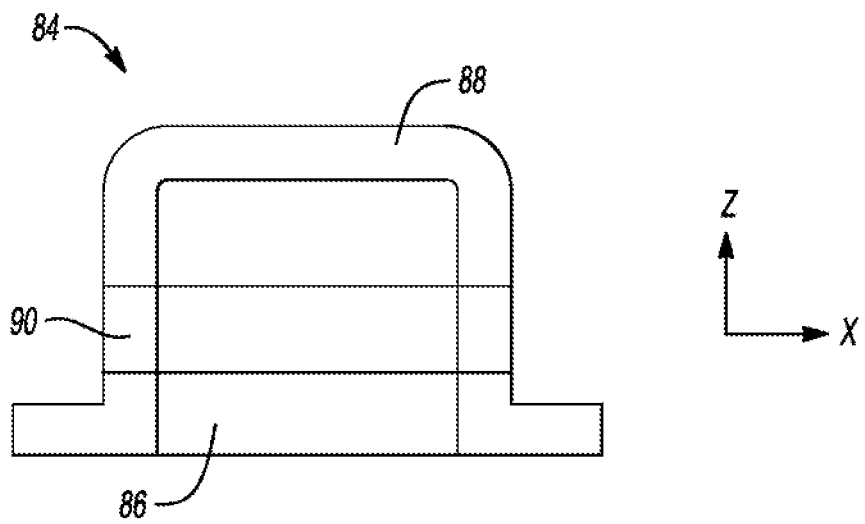
FIG. 9 is a rear view of a first configuration of a barrel type door that is made from standardized and customized subcomponents.

Referring to FIG. 9, a first modular barrel type door 84 that is made from standardized and customized subcomponents is illustrated. The first modular barrel type door 84 is comprised of a first or lower subcomponent 86, a second or upper subcomponent 88, and a customized component 90. The lower subcomponent 86 forms a first or lower portion of the first modular barrel type door 84, the upper subcomponent 88 forms a second or upper portion of the first modular barrel type door 84, and the customized component 90 forms a third or intermediate component that is disposed between the lower subcomponent 86 and the upper subcomponent 88. The customized component 90 connects the lower subcomponent 86 to the upper subcomponent 88. The customized component 90 also separates the lower subcomponent 86 from the upper subcomponent 88. The lower subcomponent 86 and the upper subcomponent 88 may not be mirror images of each other. The customized component 90 is stacked vertically on top of the lower subcomponent 86 and the upper subcomponent 88 is stacked vertically on top of the customized component 90. FIG. 9 shows includes three subcomponents, but the modular door may comprise of two or more subcomponents depending on the configuration. For example, in a two-piece configuration, the customizable subcomponent may contain both 88 and 90, or may contain both 86 and 90.

The lower subcomponent 86 and the upper subcomponent 88 are both configured to be standardized for first and second vehicle HVAC systems or for first and second configurations of the first modular barrel type door 84, while the customized component 90 is designed to be specific for a particular vehicle HVAC system or a particular modular type barrel door. For example, the customized component 90 may have a first dimension in the z-direction such that the lower subcomponent 86, the upper subcomponent 88, and the customized component 90 form the first configuration of the first modular barrel type door 84 that may be utilized in a first vehicle HVAC system (i.e., the housing of the first HVAC system may be configured to receive the first configuration of the first modular barrel type door 84). On the other hand, the customized component 90 may have a second dimension in the z-direction, that is different from the first dimension in the z-direction, such that the lower subcomponent 86, the upper subcomponent 88, and the customized component 90 form the second configuration of the first modular barrel type door 84 that may be utilized in a second vehicle HVAC system (i.e., the housing of the second HVAC system may be configured to receive the second configuration of the first modular barrel type door 84). The first and second dimensions in the z-direction may be distance, length, height, or width dimensions. Alternatively, the first and second dimensions may be angles that represent an angular position of the customized component 90 (e.g., a See angle $\alpha$ in FIG. 8 representing the angular position along the exterior plate 76 of the barrel type door 72).

It should be noted that in the first and second configurations of the first modular barrel type door 84, the dimensions of the lower subcomponent 86 and the upper subcomponent 88 will be the same in all directions while the dimension of the customized component 90 is different in the z-direction, resulting in the overall dimension of the first modular barrel type door 84 in the z-direction being different for the first and second configurations of the first modular barrel type door 84. It should also be noted that the lower subcomponent 86 and the upper subcomponent 88 may be standardized for more than two vehicle HVAC systems or for more than two configurations of the first modular barrel type door 84. As needed, different door configurations may be utilized in the same HVAC module. The lower subcomponent 86, the upper subcomponent 88, and/or the customized component 90 represented in the FIG. 9 may not necessarily be block shaped. The lower subcomponent 86, the upper subcomponent 88, and/or the customized component 90 may have non-parallel sides, rounds, and/or chamfers. The lower subcomponent 86, the upper subcomponent 88, and/or the customized component 90 may include unique air guide mechanism features such as ribs or holes.

Figure 10:
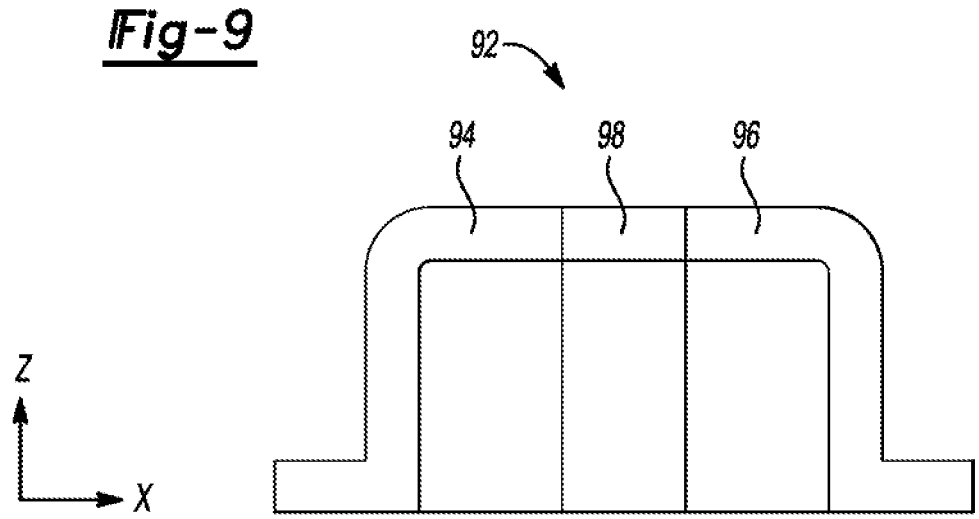
FIG. 10 is a rear view of a second configuration of a barrel type door that is made from standardized and customized subcomponents.

Referring to FIG. 10, a second modular barrel type door 92 that is made from standardized and customized subcomponents is illustrated. The second modular barrel type door 92 is comprised of a first or left side subcomponent 94, a second or right side subcomponent 96, and a customized component 98. The left side subcomponent 94 forms a first or left side of the second modular barrel type door 92, the right side subcomponent 96 forms a second or right side of the second modular barrel type door 92, and the customized component 98 forms a third or intermediate component that is disposed between the left side subcomponent 94 and the right side subcomponent 96. The customized component 98 connects the left side subcomponent 94 to the right side subcomponent 96. The customized component 98 also separates the left side subcomponent 94 from the right side subcomponent 96. The left side subcomponent 94 and the right side subcomponent 96 may be or may not be mirror images of each other. The customized component 98 is positioned horizontally between the left side subcomponent 94 and the right side subcomponent 96.

The left side subcomponent 94 and the right side subcomponent 96 are both configured to be standardized for first and second vehicle HVAC systems or for first and second configurations of the second modular barrel type door 92, while the customized component 98 is designed to be specific for a particular vehicle HVAC system or a particular modular type barrel door. For example, the customized component 98 may have a first dimension in the x-direction such that the left side subcomponent 94, the right side subcomponent 96, and the customized component 98 form the first configuration of the second modular barrel type door 92 that may be utilized in a first vehicle HVAC system (i.e., the housing of the first HVAC system may be configured to receive the first configuration of the second modular barrel type door 92). On the other hand, the customized component 98 may have a second dimension in the x-direction, that is different from the first dimension in the x-direction, such that the left side subcomponent 94, the right side subcomponent 96, and the customized component 98 form the second configuration of the second modular barrel type door 92, which may be utilized in a second vehicle HVAC system (i.e., the housing of the second HVAC system may be configured to receive the second configuration of the second modular barrel type door 92). The first and second dimensions in the x-direction may be distance, width, or length dimensions.

It should be noted that in the first and second configurations of the second modular barrel type door 92, the dimensions of the left side subcomponent 94 and the right side subcomponent 96 will be the same in all directions while the dimension of the customized component 98 is different in the x-direction, resulting in the overall dimension of the second modular barrel type door 92 in the x-direction being different for the first and second configurations of the second modular barrel type door 92. It should also be noted that the left side subcomponent 94 and the right side subcomponent 96 may be standardized for more than two vehicle HVAC systems or for more than two configurations of the second modular barrel type door 92. As needed, different door configurations may be utilized in the same HVAC module. The left side subcomponent 94, the right side subcomponent 96, and/or the customized component 98 represented in the FIG. 10 may not necessarily be block shaped. The left side subcomponent 94, the right side subcomponent 96, and/or the customized component 98 may have non-parallel sides, rounds, and/or chamfers. The left side subcomponent 94, the right side subcomponent 96, and/or the customized component 98 may include unique air guide mechanism features such as ribs or holes.

Figure 11:
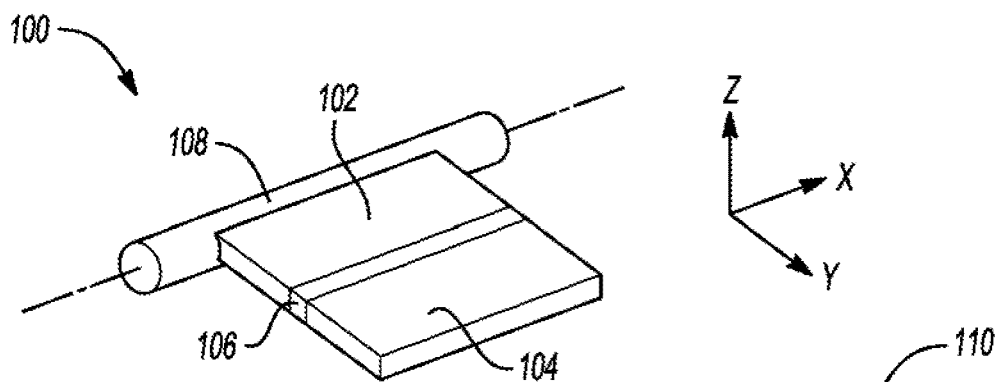
FIG. 11 is an isometric view of a flag type door that is made from standardized and customized subcomponents.

Referring to FIG. 11, a modular flag type door 100 that is made from standardized and customized subcomponents is illustrated. The modular flag type door 100 is comprised of a first or left side subcomponent 102, a second or right side subcomponent 104, and a customized component 106. The left side subcomponent 102 forms a first or left side of the modular flag type door 100, the right side subcomponent 104 forms a second or right side of the modular flag type door 100, and the customized component 106 forms a third or intermediate component that is disposed between the left side subcomponent 102 and the right side subcomponent 104. The customized component 106 connects the left side subcomponent 102 to the right side subcomponent 104. The customized component 106 also separates the left side subcomponent 102 from the right side subcomponent 104.

In the configuration shown, the left side subcomponent 102, the right side subcomponent 104, and the customized component 106 are arranged in the y-direction leaving a shaft 108 of the flag type door 100 connected to the left side subcomponent 102 only. Under such a configuration, the left side subcomponent 102 and right side subcomponent 104 are not mirror images of each other. However, the configuration in FIG. 11 may be rearranged such that the left side subcomponent 102, the right side subcomponent 104, and the customized component 106 are arranged in the x-direction, with the overall position of the flag type door 100 remaining the same as illustrated in FIG. 11, where each of the left side subcomponent 102, the right side subcomponent 104, and the customized component 106 form a portion of the shaft 108. Under such an arrangement (i.e., where the left side subcomponent 102, the right side subcomponent 104, and the customized component 106 are arranged in the x-direction), the left side subcomponent 102 and the right side subcomponent 104 may or may not be mirror images of each other.

The left side subcomponent 102 and the right side subcomponent 104 are both configured to be standardized for first and second vehicle HVAC systems or for first and second configurations of the flag type door 100, while the customized component 106 is designed to be specific for a particular vehicle HVAC system or a particular modular flag type door. For example, the customized component 106 may have a first dimension in the y-direction such that the left side subcomponent 102, the right side subcomponent 104, and the customized component 106 form the first configuration of the flag type door 100 that may be utilized in a first vehicle HVAC system (i.e., the housing of the first HVAC system may be configured to receive the first configuration of the flag type door 100). On the other hand, the customized component 106 may have a second dimension in the y-direction, that is different from the first dimension in the y-direction, such that the left side subcomponent 102, the right side subcomponent 104, and the customized component 106 form the second configuration of the flag type door 100, which may be utilized in a second vehicle HVAC system (i.e., the housing of the second HVAC system may be configured to receive the second configuration of the flag type door 100). The first and second dimensions in the y-direction may be distance, width, or length dimensions.

It should be noted that in the first and second configurations of the flag type door 100, the dimensions of the left side subcomponent 102 and the right side subcomponent 104 will be the same in all directions while the dimension of the customized component 106 is different in either the y-direction or x-direction, resulting in the overall dimension of the flag type door 100 in either the y-direction or x-direction being different for the first and second configurations of the flag type door 100. It should also be noted that the left side subcomponent 102 and the right side subcomponent 104 may be standardized for more than two vehicle HVAC systems or for more than two configurations of the flag type door 100. As needed, different door configurations may be utilized in the same HVAC module. The left side subcomponent 102, the right side subcomponent 104, and/or the customized component 106 represented in the FIG. 11 may not necessarily be block shaped. The left side subcomponent 102, the right side subcomponent 104, and/or the customized component 106 may have non-parallel sides, rounds, and/or chamfers. The left side subcomponent 102, the right side subcomponent 104, and/or the customized component 106 may include unique air guide mechanism features such as ribs or holes.

Figure 12:
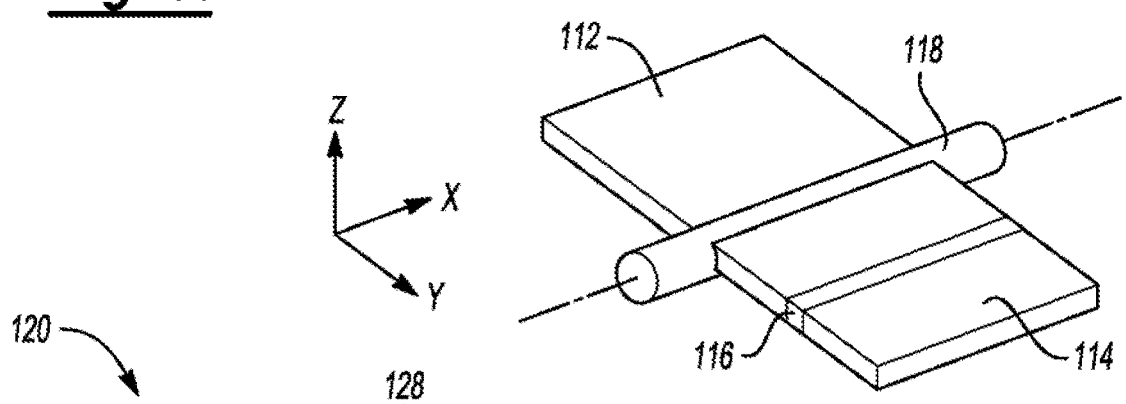
FIG. 12 is an isometric view of a butterfly type door that is made from standardized and customized subcomponents.

Referring to FIG. 12, a modular butterfly type door 110 that is made from standardized and customized subcomponents is illustrated. The modular butterfly type door 110 is comprised of a first or left side subcomponent 112, a second or right side subcomponent 114, and a customized component 116. The left side subcomponent 112 forms a first or left side of the modular butterfly type door 110, the right side subcomponent 114 forms a second or right side of the modular butterfly type door 110, and the customized component 116 forms a third or intermediate component that is disposed between the left side subcomponent 112 and the right side subcomponent 114. The customized component 116 connects the left side subcomponent 112 to the right side subcomponent 114. The customized component 116 also separates the left side subcomponent 112 from the right side subcomponent 114.

In the configuration shown, the left side subcomponent 112, the right side subcomponent 114, and the customized component 116 are arranged in the y-direction leaving a shaft 118 of the butterfly type door 110 connected to the left side subcomponent 112 only. Under such a configuration, the left side subcomponent 112 and right side subcomponent 114 are not mirror images of each other. However, the configuration in FIG. 12 may be rearranged such that the left side subcomponent 112, the right side subcomponent 114, and the customized component 116 are arranged in the x-direction, with the overall position of the butterfly type door 110 remaining the same as illustrated in FIG. 12, where each of the left side subcomponent 112, the right side subcomponent 114, and the customized component 116 form a portion of the shaft 118. Under such an arrangement (i.e., where the left side subcomponent 112, the right side subcomponent 114, and the customized component 116 are arranged in the x-direction), the left side subcomponent 112 and the right side subcomponent 114 may or may not be mirror images of each other.

In an alternative configuration, the customized component 116 may encompass the shaft 118. Under such an arrangement (i.e., where the customized component 116 encompasses the shaft 118), the left side subcomponent 112 and the right side subcomponent 114 may or may not be mirror images of each other.

The left side subcomponent 112 and the right side subcomponent 114 are both configured to be standardized for first and second vehicle HVAC systems or for first and second configurations of the butterfly type door 110, while the customized component 116 is designed to be specific for a particular vehicle HVAC system or a particular modular butterfly type door. For example, the customized component 116 may have a first dimension in the y-direction such that the left side subcomponent 112, the right side subcomponent 114, and the customized component 116 form the first configuration of the butterfly type door 110 that may be utilized in a first vehicle HVAC system (i.e., the housing of the first HVAC system may be configured to receive the first configuration of the butterfly type door 110). On the other hand, the customized component 116 may have a second dimension in the y-direction, that is different from the first dimension in the y-direction, such that the left side subcomponent 112, the right side subcomponent 114, and the customized component 116 form the second configuration of the butterfly type door 110, which may be utilized in a second vehicle HVAC system (i.e., the housing of the second HVAC system may be configured to receive the second configuration of the butterfly type door 110). The first and second dimensions in the y-direction may be distance, width, or length dimensions.

It should be noted that in the first and second configurations of the butterfly type door 110, the dimensions of the left side subcomponent 112 and the right side subcomponent 114 will be the same in all directions while the dimension of the customized component 116 is different in either the y-direction or x-direction, resulting in the overall dimension of the butterfly type door 110 in either the y-direction or x-direction being different for the first and second configurations of the butterfly type door 110. It should also be noted that the left side subcomponent 112 and the right side subcomponent 114 may be standardized for more than two vehicle HVAC systems or for more than two configurations of the butterfly type door 110. As needed, different door configurations may be utilized in the same HVAC module. The left side subcomponent 112, the right side subcomponent 114, and/or the customized component 116 represented in the FIG. 12 may not necessarily be block shaped. The left side subcomponent 112, the right side subcomponent 114, and/or the customized component 116 may have non-parallel sides, rounds, and/or chamfers. The left side subcomponent 112, the right side subcomponent 114, and/or the customized component 116 may include unique air guide mechanism features such as ribs or holes.

Figure 13:
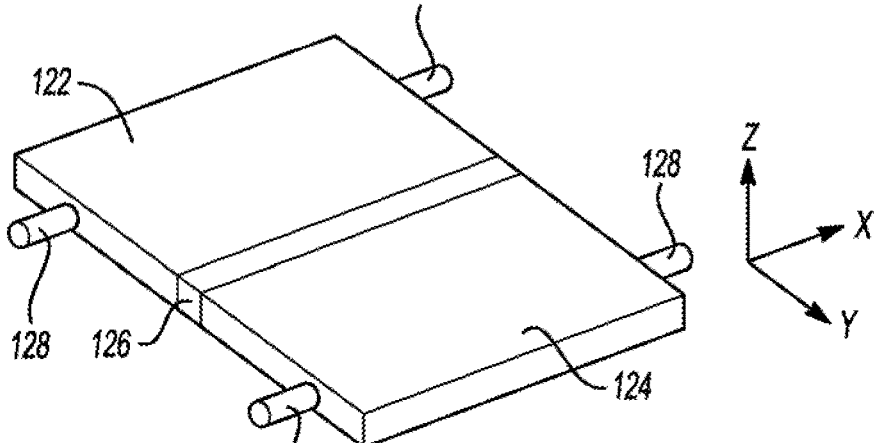
FIG. 13 is an isometric view of a pin and groove type door that is made from standardized and customized subcomponents.

Referring to FIG. 13, a modular pin and groove type door type door 120 that is made from standardized and customized subcomponents is illustrated. The modular pin and groove type door 120 is comprised of a first or left side subcomponent 122, a second or right side subcomponent 124, and a customized component 126. The left side subcomponent 122 forms a first or left side of the modular pin and groove type door 120, the right side subcomponent 124 forms a second or right side of the modular pin and groove type door 120, and the customized component 126 forms a third or intermediate component that is disposed between the left side subcomponent 122 and the right side subcomponent 124. The customized component 126 connects the left side subcomponent 122 to the right side subcomponent 124. The customized component 126 also separates the left side subcomponent 122 from the right side subcomponent 124. The left side subcomponent 122 and the right side subcomponent 124 may be or may not be mirror images of each other.

In the configuration shown, the left side subcomponent 122, the right side subcomponent 124, and the customized component 126 are arranged in the y-direction. However, the configuration in FIG. 13 may be rearranged such that the left side subcomponent 122, the right side subcomponent 124, and the customized component 126 are arranged in the x-direction with the overall position of the pin and groove type door 120 remaining the same as illustrated in FIG. 13. Under such an arrangement (i.e., where the left side subcomponent 122, the right side subcomponent 124, and the customized component 126 are arranged in the x-direction), the left side subcomponent 122 and the right side subcomponent 124 may or may not be mirror images of each other. Pins 128 that are disposed on the pin and groove type door 120 are shown to be connected to the left side subcomponent 122 and to the right side subcomponent 124. However, it should be understood that the pins 128 may be connected to the customized component 126 in addition to or in the alternative of the left side subcomponent 122 and/or the right side subcomponent 124.

The left side subcomponent 122 and the right side subcomponent 124 are both configured to be standardized for first and second vehicle HVAC systems or for first and second configurations of the pin and groove type door 120, while the customized component 126 is designed to be specific for a particular vehicle HVAC system or a particular modular pin and groove type door. For example, the customized component 126 may have a first dimension in the y-direction such that the left side subcomponent 122, the right side subcomponent 124, and the customized component 126 form the first configuration of the pin and groove type door 120 that may be utilized in a first vehicle HVAC system (i.e., the housing of the first HVAC system may be configured to receive the first configuration of the pin and groove type door 120). On the other hand, the customized component 126 may have a second dimension in the y-direction, that is different from the first dimension in the y-direction, such that the left side subcomponent 122, the right side subcomponent 124, and the customized component 126 form the second configuration of the pin and groove type door 120, which may be utilized in a second vehicle HVAC system (i.e., the housing of the second HVAC system may be configured to receive the second configuration of the pin and groove type door 120). The first and second dimensions in the y-direction may be distance, width, or length dimensions.

It should be noted that in the first and second configurations of the pin and groove type door 120, the dimensions of the left side subcomponent 122 and the right side subcomponent 124 will be the same in all directions while the dimension of the customized component 126 is different in either the y-direction or x-direction, resulting in the overall dimension of the pin and groove type door 120 in either the y-direction or x-direction being different for the first and second configurations of the pin and groove type door 120. It should also be noted that the left side subcomponent 122 and the right side subcomponent 124 may be standardized for more than two vehicle HVAC systems or for more than two configurations of the pin and groove type door 120. As needed, different door configurations may be utilized in the same HVAC module. The left side subcomponent 122, the right side subcomponent 124, and/or the customized component 126 represented in the FIG. 13 may not necessarily be block shaped. The left side subcomponent 122, the right side subcomponent 124, and/or the customized component 126 may have non-parallel sides, rounds, and/or chamfers. The left side subcomponent 122, the right side subcomponent 124, and/or the customized component 126 may include unique air guide mechanism features such as ribs or holes.

Figure 14:
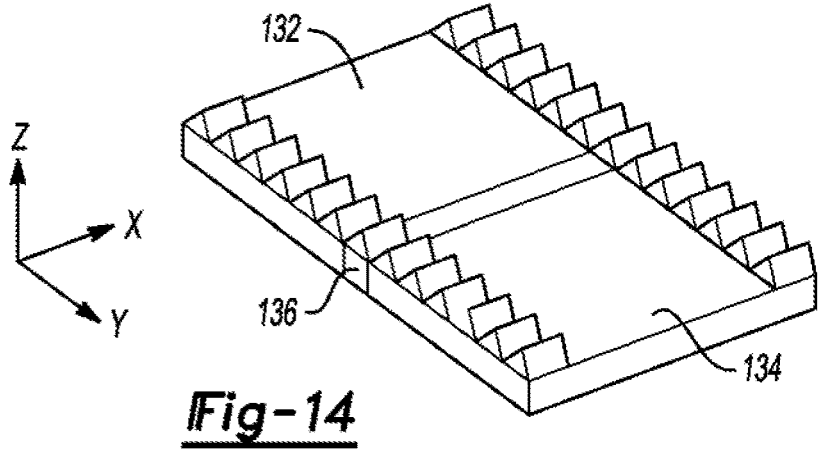
FIG. 14 is an isometric view of a rack and pinion type door that is made from standardized and customized subcomponents.

Referring to FIG. 14, a modular rack and pinion type door 130 that is made from standardized and customized subcomponents is illustrated. The modular rack and pinion type door 130 is comprised of a first or left side subcomponent 132, a second or right side subcomponent 134, and a customized component 136. The left side subcomponent 132 forms a first or left side of the modular rack and pinion type door 130, the right side subcomponent 134 forms a second or right side of the modular rack and pinion type door 130, and the customized component 136 forms a third or intermediate component that is disposed between the left side subcomponent 132 and the right side subcomponent 134. The customized component 136 connects the left side subcomponent 132 to the right side subcomponent 134. The customized component 136 also separates the left side subcomponent 132 from the right side subcomponent 134. The left side subcomponent 132 and the right side subcomponent 134 may be or may not be mirror images of each other.

In the configuration shown, the left side subcomponent 132, the right side subcomponent 134, and the customized component 136 are arranged in the y-direction. However, the configuration in FIG. 14 may be rearranged such that the left side subcomponent 132, the right side subcomponent 134, and the customized component 136 are arranged in the x-direction with the overall position of the rack and pinion type door 130 remaining the same as illustrated in FIG. 14. Under such an arrangement (i.e., where the left side subcomponent 132, the right side subcomponent 134, and the customized component 136 are arranged in the x-direction), the left side subcomponent 132 and the right side subcomponent 134 may or may not be mirror images of each other.

The left side subcomponent 132 and the right side subcomponent 134 are both configured to be standardized for first and second vehicle HVAC systems or for first and second configurations of the rack and pinion type door 130, while the customized component 136 is designed to be specific for a particular vehicle HVAC system or a particular rack and pinion type door. For example, the customized component 136 may have a first dimension in the y-direction such that the left side subcomponent 132, the right side subcomponent 134, and the customized component 136 form the first configuration of the rack and pinion type door 130 that may be utilized in a first vehicle HVAC system (i.e., the housing of the first HVAC system may be configured to receive the first configuration of the rack and pinion type door 130). On the other hand, the customized component 136 may have a second dimension in the y-direction, that is different from the first dimension in the y-direction, such that the left side subcomponent 132, the right side subcomponent 134, and the customized component 136 form the second configuration of the rack and pinion type door 130, which may be utilized in a second vehicle HVAC system (i.e., the housing of the second HVAC system may be configured to receive the second configuration of the rack and pinion type door 130). The first and second dimensions in the y-direction may be distance, width, or length dimensions.

It should be noted that in the first and second configurations of the rack and pinion type door 130, the dimensions of the left side subcomponent 132 and the right side subcomponent 134 will be the same in all directions while the dimension of the customized component 136 is different in either the y-direction or x-direction, resulting in the overall dimension of the rack and pinion type door 130 in either the y-direction or x-direction being different for the first and second configurations of the rack and pinion type door 130. It should also be noted that the left side subcomponent 132 and the right side subcomponent 134 may be standardized for more than two vehicle HVAC systems or for more than two configurations of the rack and pinion type door 130. As needed, different door configurations may be utilized in the same HVAC module. The left side subcomponent 132, the right side subcomponent 134, and/or the customized component 136 represented in the FIG. 14 may not necessarily be block shaped. The left side subcomponent 132, the right side subcomponent 134, and/or the customized component 136 may have non-parallel sides, rounds, and/or chamfers. The left side subcomponent 132, the right side subcomponent 134, and/or the customized component 136 may include unique air guide mechanism features such as ribs or holes.

Figure 15:
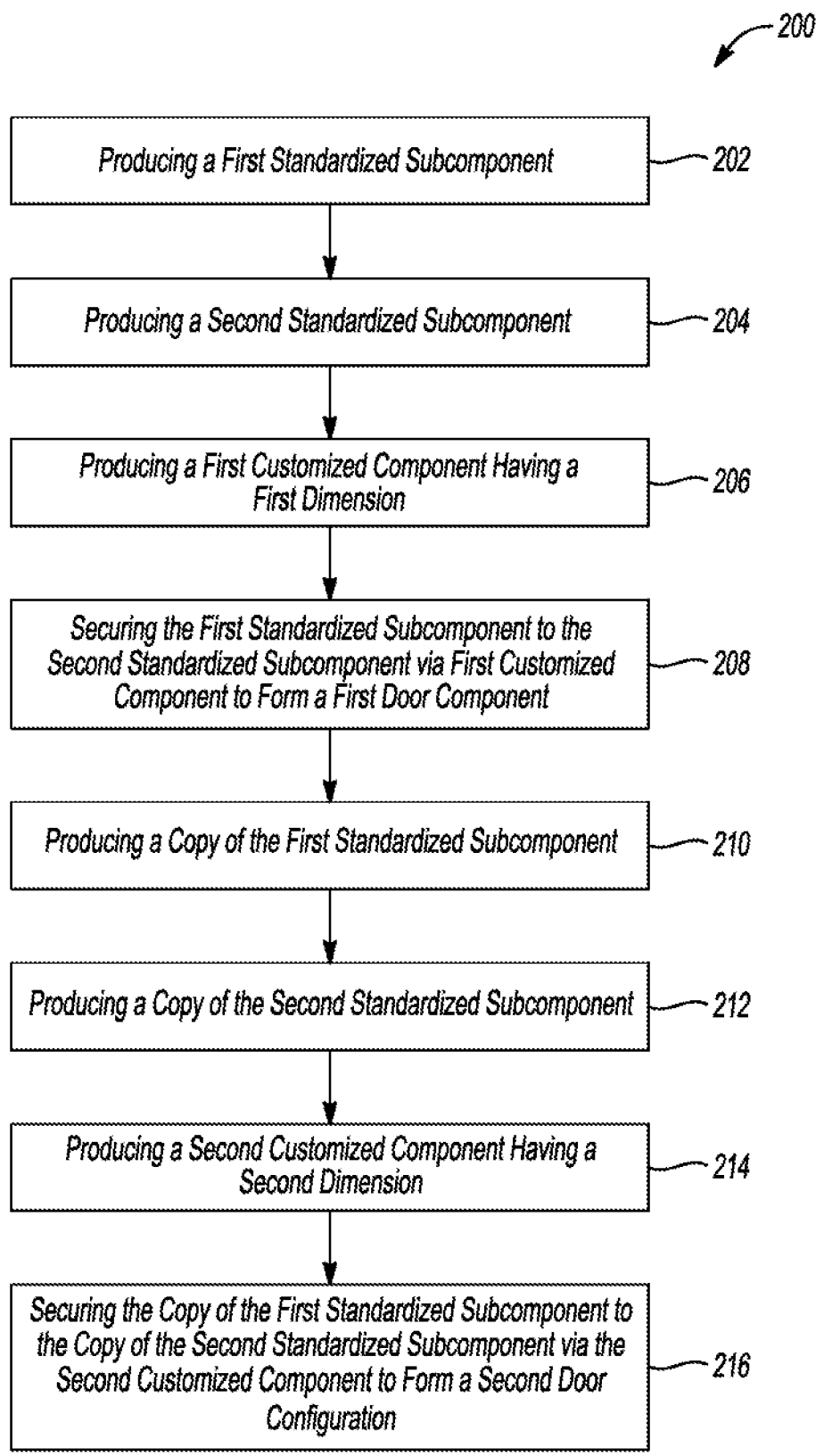
FIG. 15 is a flowchart illustrating a method of producing a modular door for a vehicle HVAC system from standardized and customized subcomponents.

Referring to FIG. 15, a flowchart of a method 200 of producing a modular door for a vehicle HVAC system (e.g., HVAC module 20) from standardized and customized subcomponents is illustrated. The method 200, for example, may be utilized to produce any of the doors depicted in FIGS. 9-14. The method 200 begins at block 202 where a first subcomponent is produced that is configured to be standardized for first and second door configurations. Next, the method 200 moves on to block 204 where a second subcomponent is produced that is also configured to be standardized for first and second door configurations. A first customized component that has a first dimension is then produced at block 206. The first dimension may be a distance (e.g., a height, length, or width dimension). Next, the method moves on to block 208 where the first subcomponent is secured to the second subcomponent via the first customized component such that the first subcomponent, the second subcomponent, and the first customized component form the first door configuration and not the second door configuration.

The standardized and customized subcomponents may be secured to each other via fasteners, adhesives, press fitting, snap fitting, welding, or by any other joining method known in the art. Alternatively, all subcomponents may be bonded together as the door shapes are being formed (i.e., steps in blocks 202, 204, 206, and 208 may occur simultaneously). For example, the standardized and customized subcomponents' molds may be separate bodies that are selectively positioned adjacent to each other in an injection molding machine. In other words, the mold within the injection molding machine may be adjustable to allow for subcomponent standardization and customization manufactured in one process.

The method 200 then moves on to block 210 where a copy of the first subcomponent is produced. Next, the method 200 moves on to block 212 where a copy of the second subcomponent is produced. The copies of the first and second subcomponents are meant be standardized in the same manner as the original first and second subcomponents (i.e., the copies of the first and second subcomponents will have the same dimensions as the original first and second subcomponents, respectively, within any allowable manufacturing tolerance requirements). A second customized component that has a second dimension is then produced at block 214. The second dimension may be a distance (e.g., a height, length, or width dimension). The first and second dimensions may have different values (e.g., the first and second dimensions may be lengths and the first dimension may be longer than the second dimension or vice versa). Next, the method moves on to block 216 where the copy of the first subcomponent is secured to the copy of the second subcomponent via the second customized component such that the copy of the first subcomponent, the copy of the second subcomponent, and the second customized component form the second door configuration and not the first door configuration.

The standardized copies and customized subcomponents may be secured to each other via fasteners, adhesives, press fitting, snap fitting, welding, or by any other joining method known in the art. Alternatively, all subcomponents may be bonded together as the door shapes are being formed (i.e., steps in blocks 210, 212, 214, and 216 may occur simultaneously). For example, the standardized copies and second customized subcomponents' molds may be separate bodies that are selectively positioned adjacent to each other in an injection molding machine. In other words, the mold within the injection molding machine may be adjustable to allow for subcomponent standardization and customization manufactured in one process It should be understood that the flowchart in FIG. 15 is for illustrative purposes only and that the method 200 should not be construed as limited to the flowchart in FIG. 15. Some of the steps of the method 200 may be rearranged while others may be omitted entirely.

Figure 16:
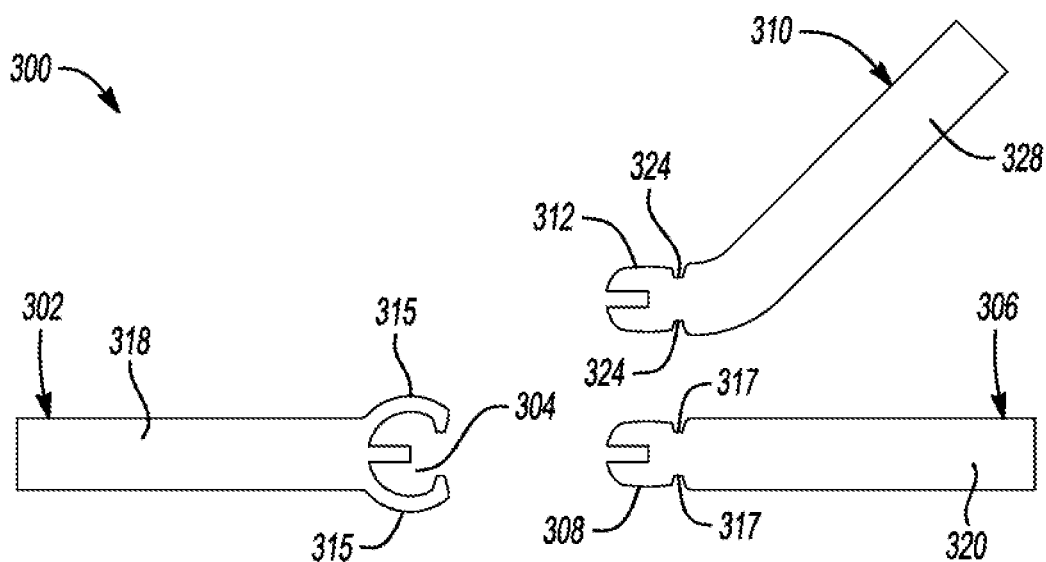
FIG. 16 is a side view of modular door kit for a vehicle HVAC system.
Figure 17:
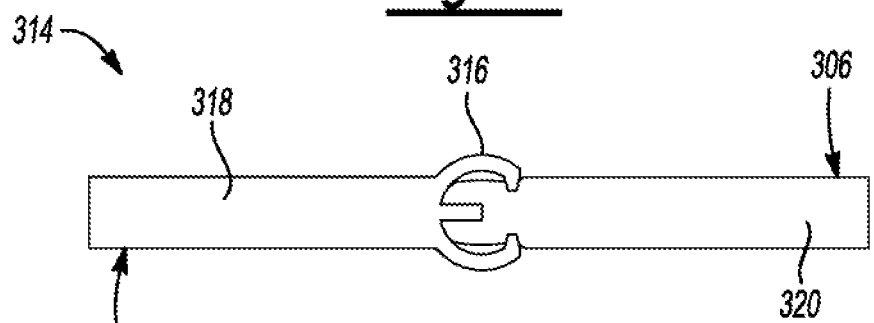
FIG. 17 is a side view of a first configuration of a butterfly type door that is made from the modular door kit depicted in FIG. 16.
Figure 18:
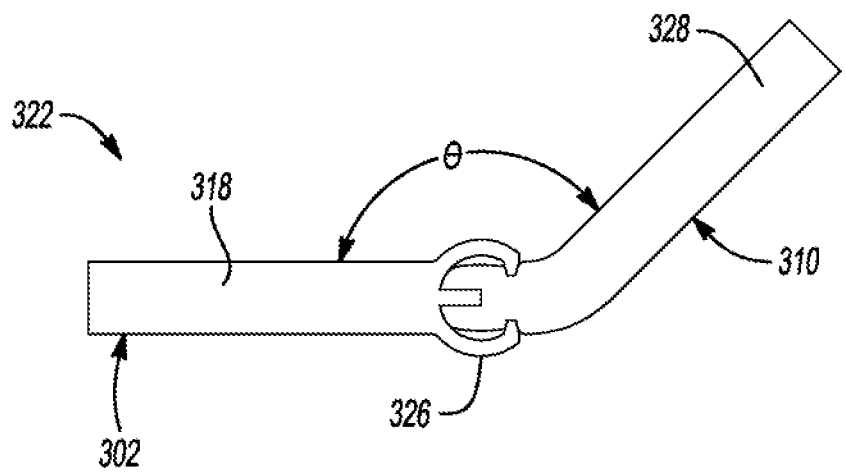
FIG. 18 is a side view of a second configuration of a butterfly type door that is made from the modular door kit depicted in FIG. 16.

Referring to FIGS. 16-18, a modular door kit 300 for a vehicle HVAC system (e.g., HVAC module 20) is illustrated in FIG. 16, while first and second door configurations that may be produced from the modular door kit 300 are illustrated in FIGS. 17 and 18, respectively. The modular door kit 300 includes a first subcomponent 302 that defines a keyed receptacle 304. The first subcomponent 302 is configured to be standardized for a first door configuration (e.g., the configuration of FIG. 17) and a second door configuration (e.g., the configuration of FIG. 18). The modular door kit 300 includes a second subcomponent 306 that has a first keyed protrusion 308. The second subcomponent 306 is configured to be standardized for the first door configuration (e.g., the configuration of FIG. 17) but not the second door configuration (e.g., the configuration of FIG. 18). The modular door kit 300 includes a third subcomponent 310 having a second keyed protrusion 312. The third subcomponent 310 is configured to be standardized for the second door configuration (e.g., the configuration of FIG. 18) but not the first door configuration (e.g., the configuration of FIG. 17).

The first keyed protrusion 308 is configured to engage the keyed receptacle 304 to rigidly affix the position of the second subcomponent 306 relative to the first subcomponent 302 to form the first door configuration 314 depicted in FIG. 17. More specifically, the keyed receptacle 304 may be partially defined by flexible prongs 315 that flex outward when the first keyed protrusion 308 is being inserted into the keyed receptacle 304 to allow for the first keyed protrusion 308 to be inserted into the keyed receptacle 304. The flexible prongs 315 may then be configured to spring back once the first keyed protrusion 308 has been inserted into the keyed receptacle 304 to trap and affix the position of the first keyed protrusion 308 within the keyed receptacle 304. The outer surface of the first keyed protrusion 308 may define notches or grooves 317 that are configured to engage the flexible prongs 315 to further assist in affixing the position of the second subcomponent 306 relative to the first subcomponent 302.

The engagement between first keyed protrusion 308 and the keyed receptacle 304 may form a shaft 316 of the first door configuration 314. The first door configuration 314 may be a butterfly type door where two flag type doors are joined together to form the butterfly type door. The two flag type doors may be parallel relative to each other. Stated in other terms, the first subcomponent 302 includes a first plate 318, the second subcomponent 306 includes a second plate 320, and the engagement between the first keyed protrusion 308 and the keyed receptacle 304 is configured to orient the first plate 318 relative to the second plate 320 such that the first plate 318 and the second plate 320 are parallel relative to each other. Alternatively, the first plate 318 may be curved as the first plate 318 extends in a direction away from the keyed receptacle 304 and the second plate 320 may be curved as the second plate 320 extends in a direction away from the first keyed protrusion 308. If the first plate 318 and/or the second plate 320 are curved, the first plate 318 and the second plate 320 will be non-parallel.

The second keyed protrusion 312 is configured to engage the keyed receptacle 304 to rigidly affix the position of the third subcomponent 310 relative to the first subcomponent 302 to form the second door configuration 322 depicted in FIG. 18. More specifically, the flexible prongs 315 may flex outward when the second keyed protrusion 312 is being inserted into the keyed receptacle 304 to allow for the second keyed protrusion 312 to be inserted into the keyed receptacle 304. The flexible prongs 315 may then be configured to spring back once the second keyed protrusion 312 has been inserted into the keyed receptacle 304 to trap and affix the position of the second keyed protrusion 312 within the keyed receptacle 304. The outer surface of the second keyed protrusion 312 may define notches or grooves 324 that are configured to engage the flexible prongs 315 to further assist in affixing the position of the third subcomponent 310 relative to the first subcomponent 302.

The engagement between second keyed protrusion 312 and the keyed receptacle 304 may form a shaft 326 of the second door configuration 322. The second door configuration 322 may be a butterfly type door where two flag type doors are joined together to form the butterfly type door. The two flag type doors may be non-parallel relative to each other. Stated in other terms, the third subcomponent 310 includes a third plate 328, and the engagement between the second keyed protrusion 312 and the keyed receptacle 304 is configured to orient the first plate 318 relative to the third plate 328 such that an angle, θ, is formed between the first plate 318 and the third plate 328. The angle, θ, may be between 0° and 180°.

Figure 19:
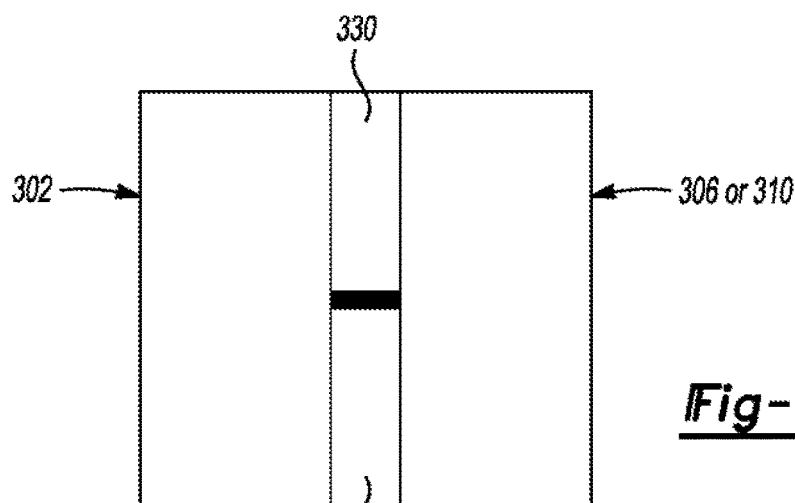
FIG. 19 is a top view of a third configuration of a butterfly type door that may be made from a modular door kit.

The modular door kit 300 should not be construed as limited to what is described in FIGS. 16-18. For example, the first subcomponent 302 may have a keyed protrusion, the second subcomponent 306 may define a keyed receptacle, and third subcomponent 310 may also define a keyed receptacle while all the remaining characteristics, attributes, and functionality of the modular door kit 300 remains the same as depicted in FIGS. 16-18. As another example as to how the modular door kit 300 may differ, the first subcomponent 302 may have a keyed protrusion on an upper portion 330 that partially forms a hinge or shaft (e.g., shaft 316 or shaft 326) and may define a keyed receptacle on a lower portion 332 that partially forms the hinge, while the second subcomponent 306 or third subcomponent 310 may define a keyed receptacle on the upper portion 330 that partially forms the hinge and may have a keyed protrusion on a lower portion 332 that partially forms hinge, or vice versa (See FIG. 19). Furthermore, the modular door kit 300 is not limited to three components but may include any number of components that may form any number of combinations of door configurations. Also, any of the subcomponents within modular door kit 300 may utilized alone (i.e., without being attached to another subcomponent) as a door. For example, the first subcomponent 302, second subcomponent 306, or third subcomponent 310 may each be utilized individually as flag-type doors within an HVAC module.

Figure 20:
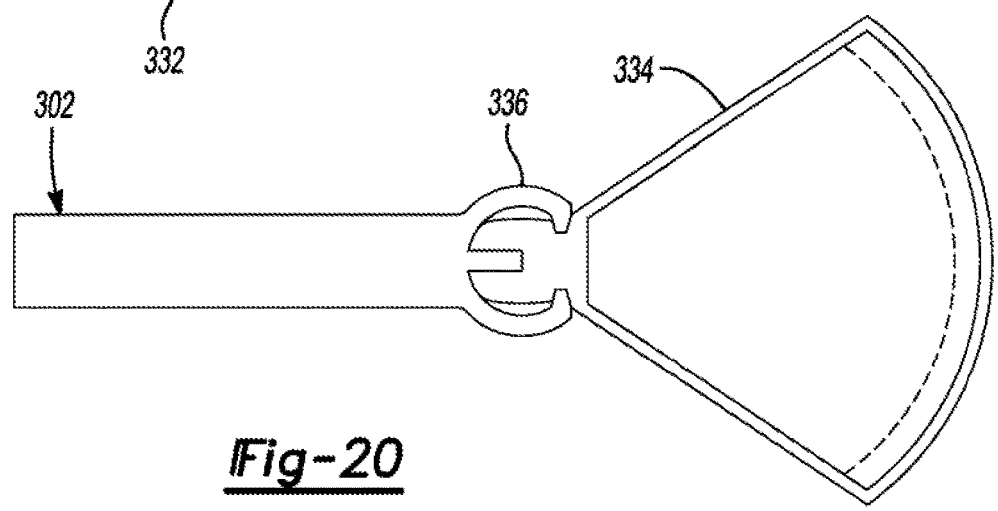
FIG. 20 is a side view of a fourth configuration of a door type door that may be made from a modular door kit.

Some of the subcomponents of the modular door kit 300 may be other types of doors (i.e., types of doors other than flag type doors), including any of the doors depicted in FIGS. 4-8. For example, in FIG. 20 the first subcomponent 302, which is a flag type door, is depicted as being connected to a barrel type door 334 that has a keyed protrusion that is engaging the keyed receptacle 304. The keyed protrusion of the barrel type door 334 and the keyed receptacle 304 of the first subcomponent may form a shaft 336.

Figure 21:
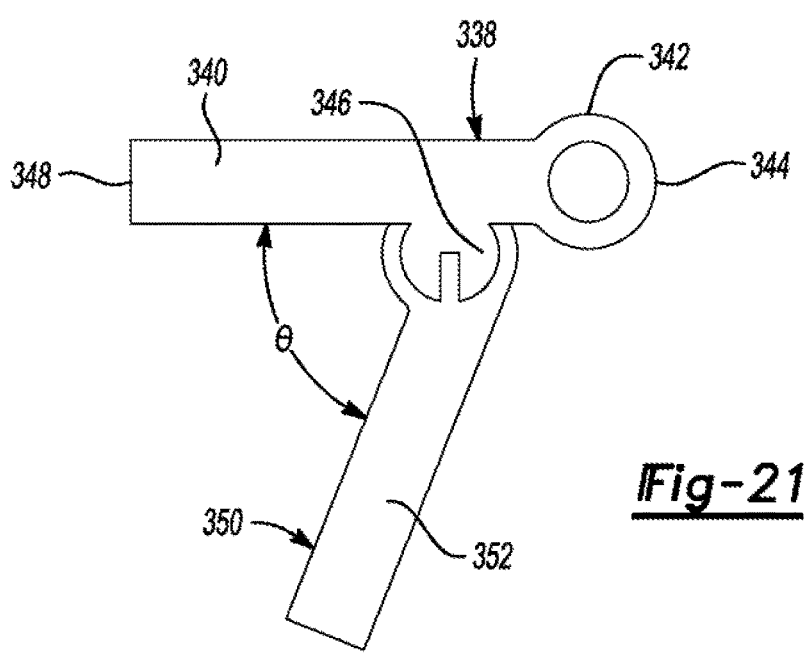
FIG. 21 is a side view of a fifth configuration of a door type door that may be made from a modular door kit.

The keyed protrusion may protrude from a portion of one of the subcomponents other than an end of a flag type door. For example, FIG. 21 depicts a first subcomponent 338 that includes a first plate 340 and a shaft 342 that disposed at a proximal end 344 of the first plate 340. The first subcomponent 338 also includes a keyed protrusion 346 that is disposed on the first plate 340 between the shaft 342 and a distal end 348 of plate 340. A second subcomponent 350 include a second plate 352 and defines a keyed receptacle. The keyed protrusion 346 of the first subcomponent 338 may engage the keyed receptacle of the second subcomponent 350 such the first plate 340 and the second plate 352 are oriented at angle, φ, that is 90° or less.

Figure 22:
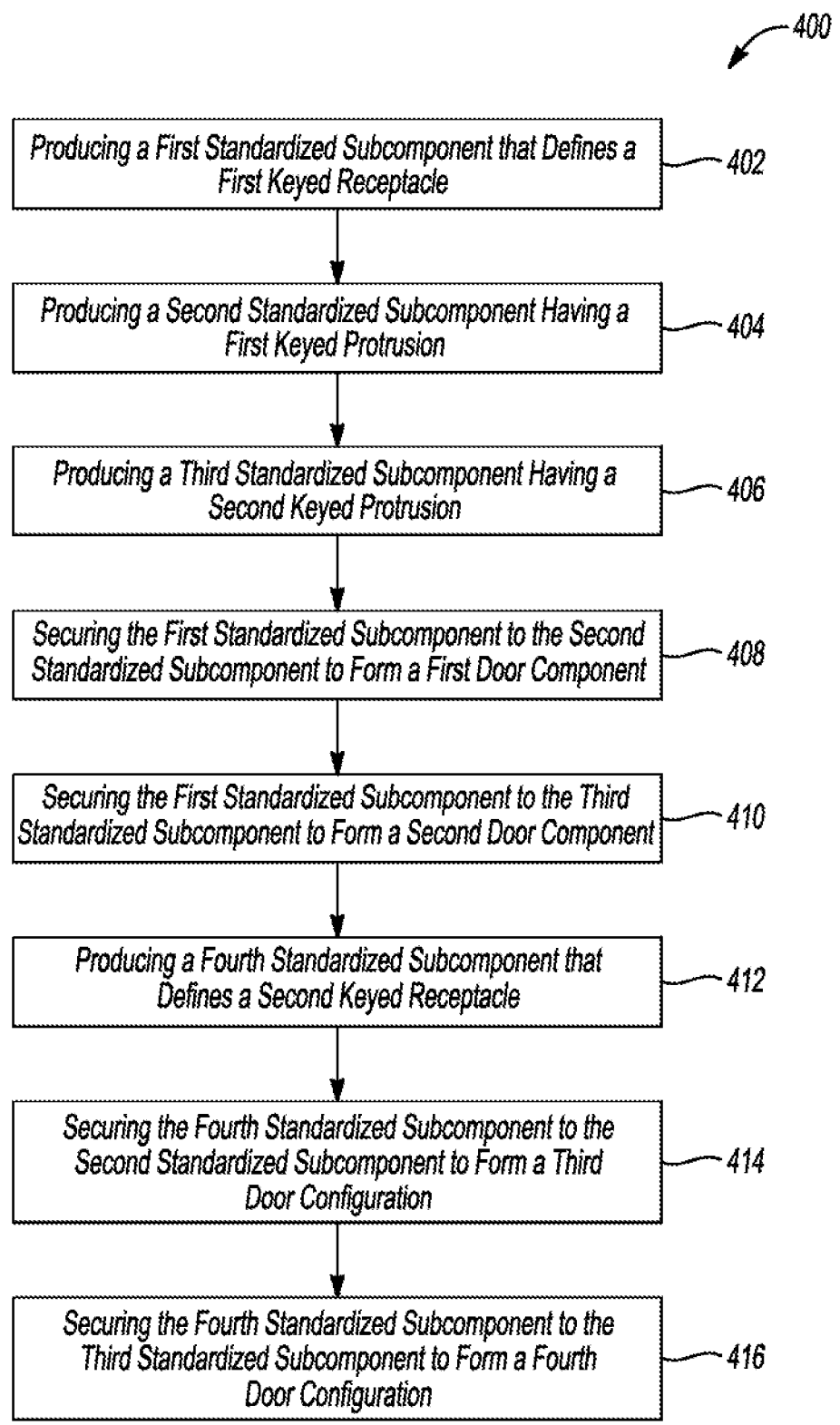
FIG. 22 is a flowchart illustrating a method of producing a modular door from a modular door kit.

Referring to FIG. 22, a flowchart of a method 400 of producing one or more modular doors for a vehicle HVAC system (e.g., HVAC module 20) from a modular door kit is illustrated. The method 400, for example, may be utilized to produce one or more of the doors depicted in FIGS. 17-21 (or variations of such doors described herein) from the kit depicted in FIG. 16 or from a kit that includes addition components (e.g., the barrel type door 334 depicted in FIG. 20 or the subcomponent 338 depicted in FIG. 21) or copies of the components depicted in FIG. 16 (i.e., first subcomponent 302, second subcomponent 306, third subcomponent 310).

The method 400 begins at block 402 where a first subcomponent is produced that is configured to be standardized for first and second door configurations. The first subcomponent may define a first keyed receptacle. Next, the method 400 moves on to block 404 where a second subcomponent is produced that is configured to be standardized for the first door configuration but not the second door configuration. The second subcomponent may have a first keyed protrusion. The method 400 then moves on to block 406 where a third subcomponent is produced that is configured to be standardized for the second door configuration but not the first door configuration. The third subcomponent may have a second keyed protrusion.

The method 400 next moves on to block 408 where the first subcomponent is secured to the second subcomponent to form the first door configuration. More specifically at block 408, the first keyed protrusion of the second subcomponent may be inserted into the first keyed receptacle of the first subcomponent to rigidly affix the first subcomponent to the second subcomponent and to form the first door configuration. After block 408, the method 400 moves on to block 410 where the first subcomponent is secured to the third subcomponent to form the second door configuration. More specifically at block 410, the second keyed protrusion of the third subcomponent may be inserted into the first keyed receptacle of the first subcomponent to rigidly affix the first subcomponent to the third subcomponent and to form the second door configuration.

It should be noted that at block 410 the first subcomponent may be secured to the third subcomponent after the first subcomponent has been detached from the second subcomponent, the step at block 408 may have been skipped so that detachment of the first subcomponent from the second subcomponent may not be required, or the first subcomponent utilized at block 410 may be a copy of the first subcomponent utilized at block 408, which was produced sometime before the step in block 410 is carried out.

After block 410, the method 400 moves on to block 412 where a fourth subcomponent is produced that is configured to be standardized for third and fourth door configurations. The fourth subcomponent may define a second keyed receptacle. Next the method 400 moves onto block 414 where the fourth subcomponent is secured to the second subcomponent to form the third door configuration. More specifically at block 412, the first keyed protrusion of the second subcomponent may be inserted into the second keyed receptacle of the fourth subcomponent to rigidly affix the fourth subcomponent to the second subcomponent and to form the third door configuration.

It should be noted that at block 414 the fourth subcomponent may be secured to the second subcomponent after the second subcomponent has been detached from the first subcomponent, the step at block 408 may have been skipped so that detachment of the second subcomponent from the first subcomponent may not be required, or the second subcomponent utilized at block 414 may be a copy of the second subcomponent utilized at block 408, which was produced sometime before the step in block 414 is carried out.

The method 400 then moves on to block 416 where the fourth subcomponent is secured to the third subcomponent to form the fourth door configuration. More specifically at block 416, the second keyed protrusion of the third subcomponent may be inserted into the second keyed receptacle of the fourth subcomponent to rigidly affix the fourth subcomponent to the third subcomponent and to form the fourth door configuration.

It should be noted that at block 416 the fourth subcomponent may be secured to the third subcomponent after the third subcomponent has been detached from the first subcomponent, the step at block 410 may have been skipped so that detachment of the third subcomponent from the first subcomponent may not be required, or the third subcomponent utilized at block 416 may be a copy of the third subcomponent utilized at block 410, which was produced sometime before the step in block 416 is carried out.

It should be understood that the flowchart in FIG. 22 is for illustrative purposes only and that the method 400 should not be construed as limited to the flowchart in FIG. 22. Some of the steps of the method 400 may be rearranged while others may be omitted entirely. For example, the first and fourth subcomponents may have first and second keyed protrusions while the second and third subcomponents may define keyed receptacles in order to form the engagements and affix the different subcomponents to each other as describe above.

Figure 23:
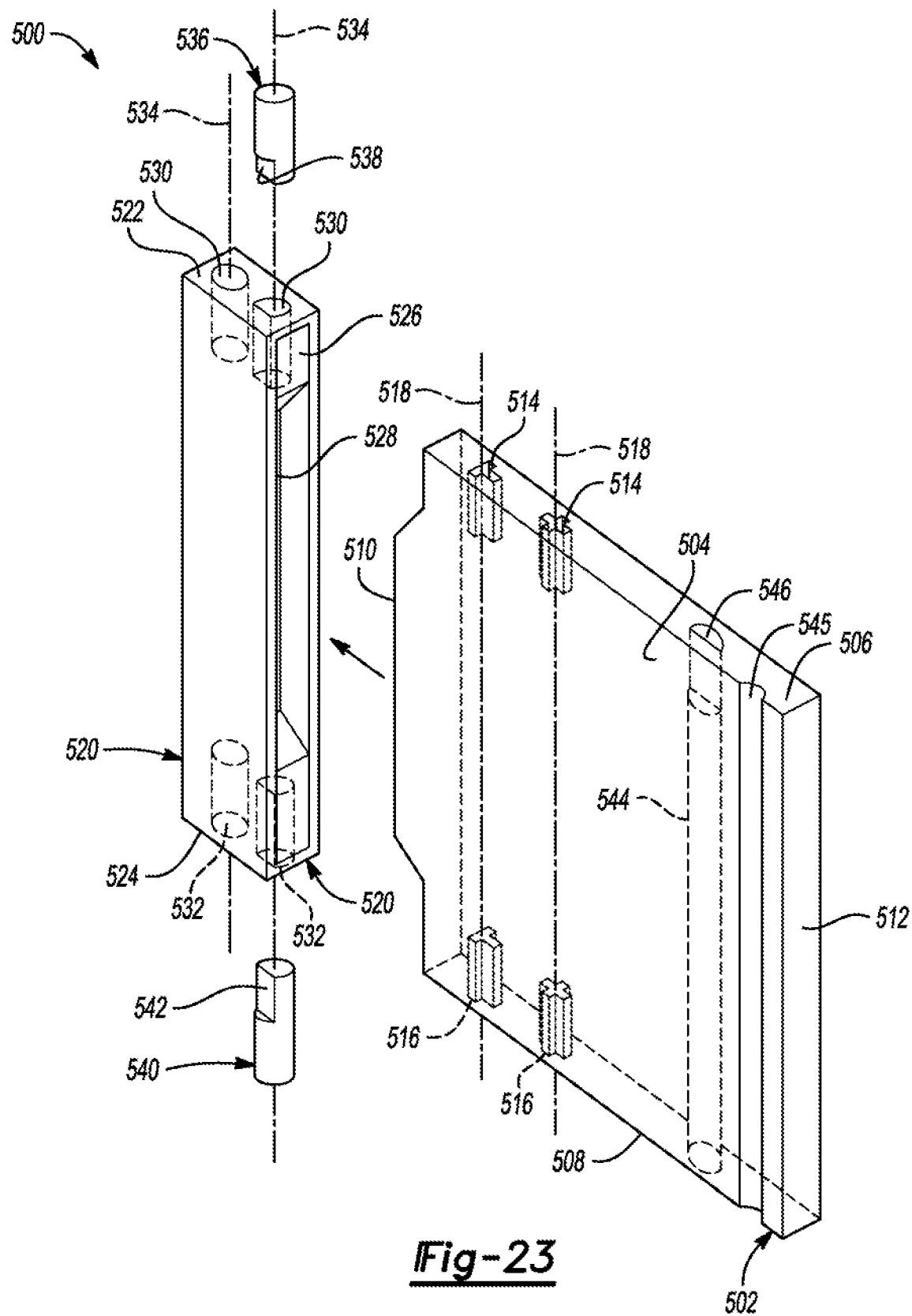
FIG. 23 is an exploded view of a modular door that may be utilized to form multiple door configurations having shafts or pegs that form different pivot points or translation positions for a vehicle HVAC system.

Referring to FIG. 23, an exploded view of a modular door 500 that may be utilized to form multiple door configurations having different pivot points or translation positions for a vehicle HVAC system (e.g., HVAC module 20) is illustrated. More specifically, the modular door 500 may be configured to pivot or translate about pegs or shafts described in further detail below. The modular door 500 includes a door plate 502 having a front surface 504 extending between an upper edge surface 506 and a lower edge surface 508. The front surface 504 also extends between a first lateral edge surface 510 and a second lateral edge surface 512 of the door plate 502. The upper edge surface 506 defines a first array of keyed orifices 514 and the lower edge surface defines a second array of keyed orifices 516. The first and second arrays of keyed orifices 514, 516 form pairs of axially aligned keyed orifices. The pairs of axially aligned keyed orifices of the first and second arrays of keyed orifices 514, 516 are aligned on common axes 518.

The modular door 500 may also include a post 520. The post 520 may have an upper edge surface 522, a lower edge surface 524, and a lateral side defining 526 a receptacle 528. The first lateral edge 510 of the door plate 502 may be disposed within the receptacle 528 to secure the door plate 502 to the post 520. The lateral edge 510 may be connected to the post 520 within the receptacle via fasteners, an adhesive, by a press fit, snap fit, welding or any other known attachment mechanism known in the art. In lieu of or in addition to the first and second arrays of keyed orifices 514, 516 defined by the upper edge and lower edge surfaces 506, 508 of the door plate 502, respectively, the upper edge surface 522 of the post 520 may define a third array of keyed orifices 530 and the lower edge surface 524 of the post 520 may define a fourth array of keyed orifices 532. The third and fourth arrays of keyed orifices 530, 532 form pairs of axially aligned keyed orifices. The pairs of axially aligned keyed orifices of the third and fourth arrays of keyed orifices 530, 532 are aligned on common axes 534.

Although arrays and pairs of keyed orifices are show to be defined in both the upper edge and lower edge surfaces 506, 508 of the door plate 502 and the upper edge and lower edge surfaces 522, 524 of the post 520, it should be understood that the arrays and pairs of keyed orifices may be defined in the door plate 502 alone, the post 520 alone, or in a combination of the door plate 502 and post 520 (as shown). Furthermore, although modular door 500 is shown to have four pairs of axially aligned keyed orifices, this disclosure should be construed to include a modular door 500 having at least two or more pairs of axially aligned keyed orifices, that are defined in the door plate 502 alone, the post 520 alone, or a combination of the door plate 502 and post 520. Also, in an embodiment where all of the arrays and pairs of keyed orifices are defined in the door plate 502 alone, the post may or may not be included as part of the modular door 500.

Each of the keyed orifices within each pair of axially aligned keyed orifices (e.g., any of the orifices that form axially aligned pairs within the first, second, third, and/or fourth arrays of keyed orifices 514, 516, 530, 532) may be identical in shape and/or size. Furthermore, each keyed orifice of the keyed orifices within each pair of axially aligned keyed orifices (e.g., any of the orifices that form axially aligned pairs within the first, second, third, and/or fourth arrays of keyed orifices 514, 516, 530, 532) may have a shape and/or size that differs from the keyed orifices that form the other pairs of axially aligned keyed orifices. For example, the orifices in one of the pairs of axially aligned keyed orifices may be D-shaped, while the orifices in another pair of axially aligned may be T-shaped, while the orifices in another pair of axially aligned may be cross-shaped, while the orifices in another pair of axially aligned may be oval-shaped, etc.

The modular door 500 may include a first peg or shaft 536 that has a first keyed protrusion 538. The first keyed protrusion 538 is shown to be disposed into a first keyed orifice of the third array of keyed orifices 530. However, it should be understood that the first keyed protrusion 538 may be disposed within any of the keyed orifices that are defined along the top of the modular door 500 (i.e., an orifice from the first or the third array of keyed orifices 514, 530) as long as the first keyed protrusion 538 has a shape (e.g., a D-shape, T-shape, cross-shape, oval-shape, etc.) that matches the keyed orifice that the first keyed protrusion 538 is being inserted into. The modular door 500 may include a second peg or shaft 540 that has a second keyed protrusion 542. The second keyed protrusion 542 is shown to be disposed in a first keyed orifice of the fourth array of keyed orifices 532. However, it should be understood that the second keyed protrusion 542 may be disposed within any of the keyed orifices that are defined along the bottom of the modular door 500 (i.e., an orifice from the second or the fourth array of keyed orifices 516, 532) as long as the second keyed protrusion 542 has a shape (e.g., a D-shape, T-shape, cross-shape, oval-shape, etc.) that matches the keyed orifice that the second keyed protrusion 542 is being inserted into.

The first keyed protrusion 538 and the second keyed protrusion 542 may have the same shape and may be inserted into orifices that form a pair of axially aligned keyed orifices such that the first shaft 536 and the second shaft 540 rotate about a common axis (i.e., one of the axes 518 or 534). Although, the first and second keyed protrusions 538, 542 are shown to be D-shaped to match the D-shaped keyed orifices, the first and second keyed protrusions 538, 542 may be any desirable shape (e.g., the D-shaped, T-shaped, cross-shaped, oval-shaped, etc.) to match the keyed orifices of a particular pair of keyed orifices and to position the axis of the door at a desired location based on the design of a particular door. Furthermore, the keyed protrusions may be press-fit into the keyed orifices to affix the position of the shafts within the modular door 500.

Assigning different shapes to each pair of keyed orifices and keyed protrusions of the shafts may be a technique that is used to ensure that the correct type of door is be constructed based on the shafts that are being connected to the doors. For example, during an assembly process where a specific door model is being constructed, if a bin of shafts have a mating protrusion that will only fit into only one type of orifice (e.g., the D-shaped orifice, T-shaped orifice, or cross-shaped orifice, oval-shaped orifice, etc.) then the person assembling the doors will only be able to construct doors that will along a particular axis. This may be referred to as poka-yoking. Furthermore, mating the keyed protrusions to the keyed orifices will also prevent the shafts from rotating within the orifices, which will ensure the entire door rotates (not just the shafts with the orifices) when an actuator that is linked to the shaft of engages to transition the door between positions within an HVAC system. It should also be understood that the mating keyed protrusion/keyed orifice shapes could be any desirable shape that will prevent the shafts from rotating within the keyed orifices defined by either the door plate 502 or post 520.

Figure 24:
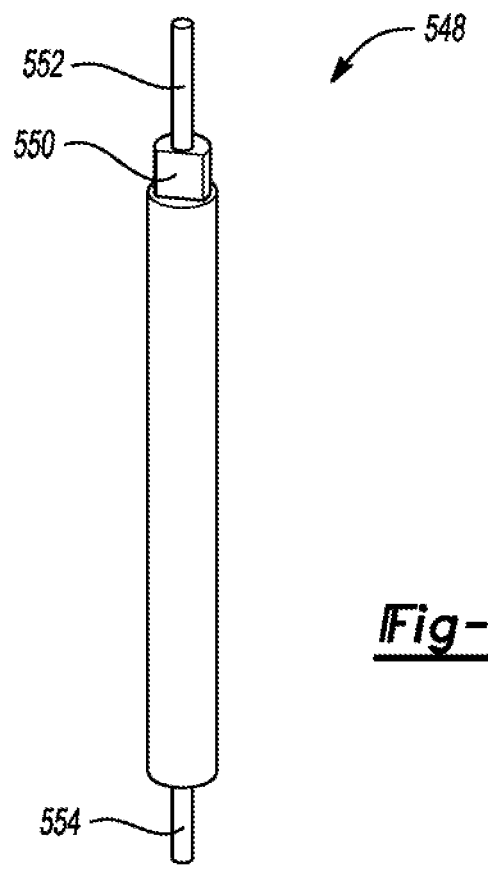
FIG. 24 is an alternative type of shaft that may be utilized to form the pivot point or translation position for the modular door in FIG. 23.

In an alternative embodiment the door plate 502 may define an array of parallel keyed cylindrical cavities that extend from the upper edge surface 506 to the lower edge surface 508 of the door plate 502 and/or the post 520 may define an array of parallel keyed cylindrical cavities that extend from the upper edge surface 522 to the lower edge surface 524 of the post 520. An example of a keyed cylindrical cavity 544 is illustrated in FIG. 23. Each of the keyed cylindrical cavities may have a keyed portion 546. Each keyed portion 546 of each keyed cylindrical cavity may have a different shape (e.g., the D-shaped orifice, T-shaped orifice, or cross-shaped orifice, oval-shaped orifice, etc.) so that the cavity matches with a shaft that may be inserted into the specific cylindrical cavity. A single cylindrical cavity 544 is shown for illustrative purposes. However, it should be understood that additional cylindrical cavities may be utilized. For example, a plurality cylindrical cavities 544 may be positioned where the pair of axially aligned keyed orifices are illustrated. An example of such shaft 548 is illustrated in FIG. 24. The shaft 548 includes a keyed portion 550 that is disposed within one of the keyed cylindrical cavities. The keyed portion 550 of the shaft 548 has specific shape that mates with the specific keyed portion 546 of the keyed cylindrical cavity that the shaft 548 is inserted into. Although, the keyed portion 550 of the shaft 548 is shown to be D-shaped, the keyed portion 550 of the shaft 548 may be any desirable shape (e.g., the D-shaped, T-shaped, cross-shaped, oval-shaped, etc.) to match the keyed portion 546 of a particular keyed cylindrical cavity and to position the axis of the door at a desired location based on the design of a particular door.

In yet another alternative embodiment the door plate 502 may define an array of parallel notches 545 that extend from the upper edge surface 506 to the lower edge surface 508 of the door plate 502 and/or the post 520 may define an array of notches 545 that extend from the upper edge surface 522 to the lower edge surface 524 of the post 520. A single notch 545 is shown for illustrative purposes. However, it should be understood that additional notches may be utilized. For example, a plurality of notches 545 may be positioned approximately where the pair of axially aligned keyed orifices are illustrated. The notches 545 may be sized to receive a single shaft (e.g., shaft 548) or pairs of shafts (e.g., first shaft 536 and second shaft 540).

The shaft 548 may include an upper end 552 that protrudes from either upper edge surface 506 of the door plate 502 or the upper edge surface 522 of the post 520 when the shaft 548 is inserted into the keyed cylindrical cavity 544. The shaft 548 may include a lower end 554 that protrudes from either lower edge surface 508 of the door plate 502 or the lower edge surface 524 of the post 520 when the shaft 548 is inserted into the keyed cylindrical cavity 544. The upper end 552 and the lower end 554 may comprise the portions of the shaft 548 about which the modular door 500 rotates when the modular door is connected to a vehicle HVAC system (e.g., HVAC module 20). The shaft 548 and the engagement between the keyed portion 550 of the shaft 548 and the keyed portion 546 of the keyed cylindrical cavity 544 will have the same function and characteristics as the first and second shafts 536, 540 and the respective engagement between the first and second shafts 536, 540 and the aligned pair of keyed orifices.

Figure 25:
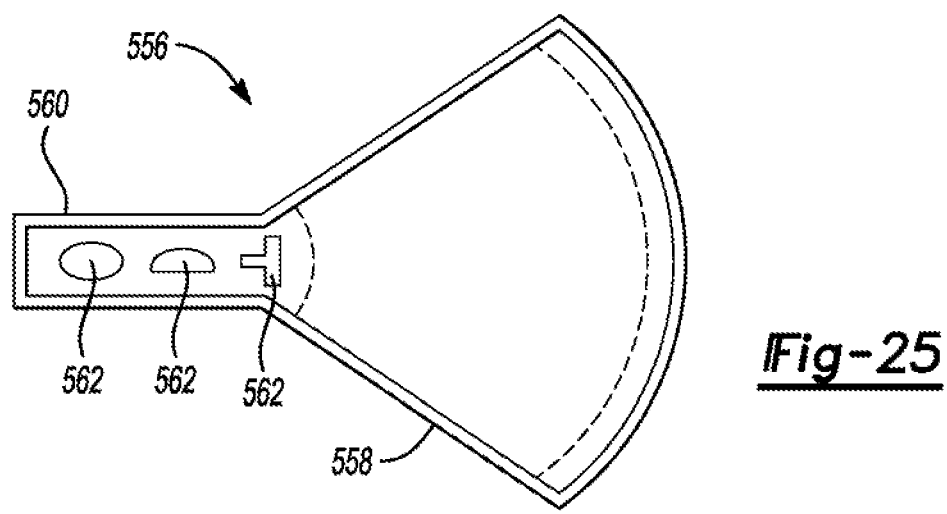
FIG. 25 is a top view of an alternative embodiment of the modular door in FIG. 23.

The same concept of to poka-yoking may be applied to any type of door that may be used in a vehicle HVAC system. For example, FIG. 25 depicts a modular door 556 that comprises a barrel door 558 that is connect to an extension or plate 560 that defines a plurality of keyed orifices 562 that are configured to receive keyed protrusions of shafts in any similar manner as described above.

It should be understood that the designations of first, second, third, fourth, etc. for subcomponents, posts, blocks, steps, keyed protrusions, keyed receptacles, keyed orifices, arrays of keyed orifices, shafts, plates, door plates, or any other component, state, or condition described herein may be rearranged in the claims so that they are in chronological order with respect to the claims.

The following applications are related to the present application: U.S. patent application Ser. No. 16/813,856 (DIAI 0320 PUS) and U.S. patent application Ser. No. 16/813,870 (DIAI 0321 PUS), all filed on Mar. 10, 2020. Each of the identified applications is incorporated by reference herein in its entirety.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A modular door for a vehicle HVAC system comprising:
 a door plate having a front surface extending between an upper edge surface and a lower edge surface, the upper edge surface defining a first array of keyed orifices and the lower edge surface defining a second array of keyed orifices, wherein the first and second arrays of keyed orifices form pairs of axially aligned keyed orifices, and wherein each of the keyed orifices within each pair axially aligned of keyed orifices has a shape that differs from the keyed orifices that form the other pairs of axially aligned keyed orifices;
 a first shaft having a first keyed protrusion disposed within a first keyed orifice of the first array of keyed orifices; and
 a second shaft having a second keyed protrusion disposed within a first keyed orifice of the second array of keyed orifices, wherein the first keyed orifice of the first array of keyed orifices and the first keyed orifice of the second array of keyed orifices form a first pair of the pairs of axially aligned keyed orifices.

2. The modular door for a vehicle HVAC system of claim 1, wherein each of the keyed orifices within each pair of axially aligned keyed orifices are identical in shape.

3. The modular door for a vehicle HVAC system of claim 1 wherein each of the keyed orifices within each pair axially aligned of keyed orifices has a size that differs from the keyed orifices that form the other pairs of axially aligned keyed orifices.

4. The modular door for a vehicle HVAC system of claim 1, wherein each of the keyed orifices of the first pair of axially aligned keyed orifices are T-shaped.

5. The modular door for a vehicle HVAC system of claim 1, wherein each of the keyed orifices of the first pair of axially aligned keyed orifices are cross-shaped.

6. The modular door for a vehicle HVAC system of claim 1 further comprising a barrel type door secured to a first lateral end of the door plate.

7. A modular door for a vehicle HVAC system comprising:
 a post having an upper edge surface, a lower edge surface, a lateral side defining a receptacle, the upper edge surface defining a first array of keyed orifices and the lower edge surface defining a second array of keyed orifices, wherein the first and second arrays of keyed orifices form pairs of axially aligned keyed orifices;
 a door plate having a lateral edge disposed within the receptacle;
 a first shaft having a first keyed protrusion disposed within a first keyed orifice of the first array of keyed orifices; and
 a second shaft having a second keyed protrusion disposed within a first keyed orifice of the second array of keyed orifices, wherein the first keyed orifice of the first array of keyed orifices and the first keyed orifice of the second array of keyed orifices form a first pair of the pairs of axially aligned keyed orifices.

8. The modular door for a vehicle HVAC system of claim 7, wherein each of the keyed orifices within each pair of axially aligned keyed orifices are identical in shape.

9. The modular door for a vehicle HVAC system of claim 7, wherein each of the keyed orifices within each pair axially aligned of keyed orifices has a shape that differs from the keyed orifices that form the other pairs of axially aligned keyed orifices.

10. The modular door for a vehicle HVAC system of claim 9, wherein each of the keyed orifices within each pair axially aligned of keyed orifices has a size that differs from the keyed orifices that form the other pairs of axially aligned keyed orifices.

11. The modular door for a vehicle HVAC system of claim 9, wherein each of the keyed orifices of the first pair of axially aligned keyed orifices are T-shaped.

12. The modular door for a vehicle HVAC system of claim 9, wherein each of the keyed orifices of the first pair of axially aligned keyed orifices are cross-shaped.

13. The modular door for a vehicle HVAC system of claim 7 further comprising a barrel type door secured to a first lateral end of the door plate.

14. A modular door for a vehicle HVAC system comprising:
 a door plate having a front surface extending between an upper edge surface and a lower edge surface, the door plate defining an array of parallel keyed cavities that extend from the upper edge surface to the lower edge surface; and
 a shaft having a keyed portion disposed within a first keyed cavity of the array of keyed cavities and having first and second ends that protrude from the upper edge surface and the lower edge surface, respectively.

15. The modular door for a vehicle HVAC system of claim 14, wherein each of the keyed cavities has a shape that differs from the other keyed cavities.

16. The modular door for a vehicle HVAC system of claim 15, wherein the first of the keyed cavities is D-shaped.

17. The modular door for a vehicle HVAC system of claim 15, wherein the first of the keyed cavities is T-shaped.

18. The modular door for a vehicle HVAC system of claim 15, wherein the first of the keyed cavities is cross-shaped.

19. The modular door for a vehicle HVAC system of claim 15, wherein the first of the keyed cavities is oval-shaped.

* * * * *